United States Patent
Ferrara et al.

(10) Patent No.: US 12,120,305 B2
(45) Date of Patent: *Oct. 15, 2024

(54) COLOUR CONVERSION WITHIN A HIERARCHICAL CODING SCHEME

(71) Applicant: V-NOVA INTERNATIONAL LIMITED, London (GB)

(72) Inventors: Simone Ferrara, London (GB); Guido Meardi, London (GB)

(73) Assignee: V-Nova International Limited, London (GB)

( * ) Notice: Subject to any disclaimer, the term of this patent is extended or adjusted under 35 U.S.C. 154(b) by 6 days.

This patent is subject to a terminal disclaimer.

(21) Appl. No.: 18/057,086

(22) Filed: Nov. 18, 2022

(65) Prior Publication Data

US 2023/0156195 A1    May 18, 2023

Related U.S. Application Data

(63) Continuation of application No. 17/284,324, filed as application No. PCT/GB2019/052867 on Oct. 19, 2019, now Pat. No. 11,509,902.

(30) Foreign Application Priority Data

Oct. 9, 2018  (GB) ...................................... 1816469
Dec. 14, 2018 (GB) ...................................... 1820473
(Continued)

(51) Int. Cl.
*H04N 19/132* (2014.01)
*H04N 19/172* (2014.01)
(Continued)

(52) U.S. Cl.
CPC ......... *H04N 19/132* (2014.11); *H04N 19/172* (2014.11); *H04N 19/184* (2014.11);
(Continued)

(58) Field of Classification Search
CPC .. H04N 19/132; H04N 19/172; H04N 19/184; H04N 19/186; H04N 19/30;
(Continued)

(56) References Cited

U.S. PATENT DOCUMENTS 9,275,445 B2  3/2016 Granados et al.
9,437,171 B2  9/2016 Narasimha et al.
(Continued)

FOREIGN PATENT DOCUMENTS

CN   102132563 A   7/2011
CN   106464892 A   2/2017
(Continued)

OTHER PUBLICATIONS

"ST 2086:2018—SMPTE Standard—Mastering Display Color Volume Metadata Supporting High Luminance and Wide Color Gamut Images," in ST 2086:2018 , vol., no., pp. 1-8, Apr. 27, 2018, doi: 10.5594/SMPTE.ST2086.2018. (Year: 2018).*
(Continued)

*Primary Examiner* — Marnie A Matt
(74) *Attorney, Agent, or Firm* — Workman Nydegger

(57) ABSTRACT

There is provided a method for processing an input signal (700). The input signal (700) is processed at least by converting the input signal (700) from a first colour space to a second colour space, to produce a first processed signal. The processed signal is encoded by a first encoding module (703) to generate a first encoded signal (710). A decoded signal is generated by decoding the first encoded signal (710). The decoded signal is processed at least by converting the decoded signal from the second colour space to the first colour space to produce a second processed signal. The second processed signal and the input signal (700) are processed by a second encoding module (707) to generate a second encoded signal (720).

18 Claims, 14 Drawing Sheets

(30) Foreign Application Priority Data

Jan. 14, 2019 (GB) .................................. 1900511
Feb. 13, 2019 (GB) .................................. 1902008

(51) Int. Cl.
*H04N 19/184* (2014.01)
*H04N 19/186* (2014.01)
*H04N 19/30* (2014.01)
*H04N 19/33* (2014.01)
*H04N 19/46* (2014.01)
*H04N 19/98* (2014.01)

(52) U.S. Cl.
CPC .......... *H04N 19/186* (2014.11); *H04N 19/30* (2014.11); *H04N 19/33* (2014.11); *H04N 19/46* (2014.11); *H04N 19/98* (2014.11)

(58) Field of Classification Search
CPC ........ H04N 19/33; H04N 19/46; H04N 19/98; H04N 21/234327; H04N 7/0102; H04N 19/70
USPC ...................................... 375/240.2
See application file for complete search history.

(56) References Cited

U.S. PATENT DOCUMENTS

| | | | |
|---|---|---|---|
| 9,979,895 | B2 | 5/2018 | Smolic et al. |
| 2010/0046612 | A1 | 2/2010 | Sun et al. |
| 2010/0226427 | A1 | 9/2010 | Jung et al. |
| 2011/0194618 | A1* | 8/2011 | Gish .................. G06T 5/50 375/E7.027 |
| 2013/0294495 | A1 | 11/2013 | Rossato et al. |
| 2013/0294704 | A1 | 11/2013 | Rossato et al. |
| 2014/0247869 | A1 | 9/2014 | Su et al. |
| 2015/0078661 | A1 | 3/2015 | Granados et al. |
| 2015/0092850 | A1* | 4/2015 | Talebi Esfandarani ..................... H04N 19/105 375/240.12 |
| 2015/0326896 | A1 | 11/2015 | Su et al. |
| 2015/0341675 | A1* | 11/2015 | Su .................. H04N 19/33 375/240.15 |
| 2016/0301934 | A1* | 10/2016 | Su .................. H04N 19/30 |
| 2016/0316215 | A1 | 10/2016 | Minoo et al. |
| 2017/0026646 | A1* | 1/2017 | Minoo ................. H04N 19/46 |
| 2017/0070719 | A1 | 3/2017 | Smolic et al. |
| 2017/0070735 | A1 | 3/2017 | Ramasubramonian |
| 2017/0078706 | A1* | 3/2017 | Van Der Vleuten ... H04N 19/98 |
| 2017/0085918 | A1* | 3/2017 | Su .................. H04N 19/179 |
| 2017/0127085 | A1* | 5/2017 | Sun .................. H04N 19/117 |
| 2017/0310981 | A1 | 10/2017 | Agostinelli |
| 2018/0220144 | A1 | 8/2018 | Su |
| 2018/0367800 | A1 | 12/2018 | Damnjanovic et al. |
| 2018/0367819 | A1* | 12/2018 | Van Der Vleuten ... H04N 19/46 |
| 2019/0297339 | A1 | 9/2019 | Hannuksela et al. |
| 2020/0366943 | A1* | 11/2020 | Van Der Vleuten ......................... G09G 3/2003 |
| 2021/0176471 | A1* | 6/2021 | Andrivon ............ H04N 19/146 |
| 2022/0368908 | A1* | 11/2022 | Minoo ................. H04N 19/117 |
| 2023/0188761 | A1* | 6/2023 | Van Der Vleuten ..... G09G 5/10 382/166 |

FOREIGN PATENT DOCUMENTS

| | | |
|---|---|---|
| CN | 106713912 A | 5/2017 |
| CN | 107431808 A | 12/2017 |
| EP | 3308541 A1 | 4/2018 |
| WO | 2010/105036 A1 | 9/2010 |
| WO | 2013-011466 | 1/2013 |
| WO | 2013-011492 | 1/2013 |
| WO | 2014-170819 | 10/2014 |
| WO | 2017-089839 | 6/2017 |

OTHER PUBLICATIONS

Frederique Dufaux et al., "Chapter 10: High Dynamic Range Video: Acquisition, Display and Applications", Elsevier Science & Technology, Jan. 1, 2016, Elsevier, SP055525579, ISBN: 978-0-08-100412-8, pp. 277-280, accessed on Apr. 9, 2021 via https://learning oreilly.com/library/view/High+Dyamic+Range+Video/9780128030394/ B9780081004128000103.xhtml#s0020.

International Search Report and Written Opinion for PCT/GB2019/052867 mailed Dec. 19, 2019.

Mai Zicong et al., "Visually Favorable Tone-Mapping with High Compression Performance in Bit-Depth Scalable Video Coding", IEEE Transactions on Multimedia, IEEE Service Center, Piscataway, NJ, US, vol. 15, No. 7, Nov. 1, 2013, pp. 1503-1518, XP011529386, ISSN: 1520-9210, DOI: 10.1109/TMM.2013.2266633 [retrieved on Oct. 11, 2013].

International Preliminary Report on Patentability received for PCT Patent Application No. PCT/GB2019/052867, mailed on Apr. 22, 2021, 9 pages.

U.S. Appl. No. 17/287,324, Jun. 27, 2022, Notice of Allowance.
U.S. Appl. No. 17/284,324, Feb. 15, 2022, Office Action.

\* cited by examiner

COLOUR CONVERSION WITHIN A HIERARCHICAL CODING SCHEME

CROSS-REFERENCE TO RELATED APPLICATIONS

This application is a continuation U.S. application Ser. No. 17/284,324, filed Apr. 9, 2021, which is a 371 US Nationalization of International Application No. PCT/GB2019/052867, filed Oct. 9, 2019, which claims priority to United Kingdom Patent Application No. 1902008.0, filed Feb. 13, 2019, United Kingdom Patent Application No. 1900511.5, filed Jan. 14, 2019, United Kingdom Patent Application No. 1820473.5, filed Dec. 14, 2018, and United Kingdom Patent Application No. 1816469.9, filed Oct. 9, 2018, the disclosures of which are hereby incorporated by reference herein in their entirety.

BACKGROUND/SUMMARY

Technical Field

The present invention relates to methods for processing signals, in particular video signals. Processing signals may include, but is not limited to, obtaining, deriving, outputting, receiving and reconstructing data such as those to increase the dynamic colour range in a video signal.

Background

Technological progress means that there are many different techniques and methods for processing signals, especially for compression, storage and transmission. For example, over the years, many ways to encode picture and video signals so that the information is compressed have been developed. This has benefits of reducing the storage requirements and bandwidth requirements of any transmission path, either via over-the-air terrestrial broadcasts, cable broadcasts, satellite broadcasts, or via the Internet or other data networks. As technology advances, more sophisticated methods of compression and transmission have been developed. Increased quality signals are desired, for example signals having increased video resolution (manifesting as increased pixels per frame or increased frames per second) are in demand. As a result, there are many signal formats in existence, and many types of signal encoders and decoders that may or may not be able to use those formats. This creates a problem for content creators and distributors, as they wish to ensure their content is available to the widest audiences. As a result, the creators and distributors have to provide their content in many different encoding formats, for example, encoded using standard encoding techniques such as MPEG-2, MPEG-4 Part 10, High Efficiency Video Coding (HEVC), etc. In addition, the distribution of the encoded signals is also facilitated by standard and non-standard broadcasting and streaming techniques. All in all, this makes for a complex situation increasing the costs for content distributors, and it makes the adoption of newer and better technologies more difficult owing to the lack of compatibility of older technologies (e.g. such as legacy decoders and set-top boxes) which remain widespread.

High Dynamic Range (HDR) video has demonstrated the potential to transmit much higher quality video by adding one dimension of quality improvements, that is, aside from increasing resolution (i.e., more pixels per frame) and increasing motion fidelity (i.e., more frames per second), operators can also increase dynamic range (i.e., greater range of luminance, and more tones, and thus more vivid contrasts and colours). Broad availability of HDR-capable displays is making HDR video increasingly relevant.

High Dynamic Range (HDR) typically refers to a higher luminance and/or colour range than Standard Dynamic Range (SDR), the latter using a conventional gamma curve to represent a range of colours. HDR typically works by changing the value of the brightest and the darkest colours, as well as by using a different colour plane (typically extended from the standard colour plane to a wider colour gamut plane).

There are various HDR implementations currently on the market, typically requiring a 10-bit (or even higher bit-depth) representation of colour components (e.g. luma Y and chroma Cb and Cr), in order to have a sufficiently large range of available values. One such HDR implementation is HDR10, which uses static metadata in a video signal to adjust the range of luminance and colours represented in a video stream. In this way, a single HDR setting is applied throughout the video sequence. Different implementations using dynamic metadata go under various commercial names, such as HDR10+ or Dolby® Vision. With dynamic metadata, the HDR settings are changed on a frame-by-frame basis, thus allowing greater granularity and adaptation to change of scenes.

However, transmission of HDR video currently requires decoders able to decode native 10-bit video formats, such as HEVC. This often requires duplication of video workflows, since most operators need to continue serving the large portion of their customer base that only possesses legacy devices able to decode 8-bit AVC/H.264 video. Similarly, it also prevents operators from using HDR with 8-bit formats such as VP9. In addition, the tone mapping required by HDR is not necessarily a best fit to optimize compression efficiency. For further information on this aspect, we refer to the following paper: A. Banitalebi-Dehkordi, M. Azimi, M. T. Pourazad and P. Nasiopoulos, "Compression of high dynamic range video using the HEVC and H.264/AVC standards," 10th International Conference on Heterogeneous Networking for Quality, Reliability, Security and Robustness, Rhodes, 2014, pp. 8-12.

There is a general problem with the incompatibility of newer coding standards, and in particular HDR-related standards or techniques, with legacy decoding equipment that cannot easily be replaced or upgraded. There is also a general problem of limited bandwidth availability for transmitting signals. There is also a general problem of the processing and storage overhead for content distributers in creating and maintaining many versions of the same content encoded in different ways, and this problem is exacerbated by the introduction of several competing and broadly incompatible techniques of encoding HDR-type signals (i.e. those signals having the potential for greater luminance ranges and contrast ratios and/or those signals containing information representative of a wider colour gamut).

This disclosure aims to solve one or more of the above-identified problems.

SUMMARY OF THE INVENTION

In this disclosure, we describe how HDR-type information could be combined in a hierarchical coding scheme in a way directed to solving one or more of the above-mentioned problems. In particular, it is an aim to provide encoding and decoding schemes which allow hierarchical signals to be encoded, transmitted and decoded in such a way as to enable HDR-type signals to be presented to a user via an HDR compatible display device, or to enable non-HDR equivalent signals to be presented to a user when one or more of the decoder technology or the associated display device is unable to process the HDR-type information. In particular, it is an aim to provide more elegant and efficient methods. It is an aim to provide, where possible, a composite encoded video stream comprising all of the information necessary for an HDR-type decoding, and an SDR-type encoding, and to provide flexibility in whether or not the information necessary for an HDR-type decoding is streamed to a decoder, or in whether or not the information necessary for an HDR-type decoding is used at the decoder (e.g. the information may be ignored or discarded).

There is provided a method, a computer program, a computer readable storage medium or data carrier, and a data processing apparatus according to the appended claims.

According to a first aspect of the invention, there is provided a method of encoding a signal. The method comprises processing an input signal at least by converting the input signal from a first colour space to a second colour space, to produce a first processed signal. A first encoding module encodes the first processed signal to generate a first encoded signal, which is decoded to generate a decoded signal. The decoded signal is then processing at least by converting the decoded signal from the second colour space to the first colour space, to produce a second processed signal. A second encoding module then processes the second processed signal and the input signal to generate a second encoded signal. In this way, one or more of signal improvements, reduced bandwidth potential, and backwards compatibility are provided.

The second encoded signal may contain additional ancillary data for reconstruction of the input signal using the first encoded signal.

The second encoded signal may comprise a residual signal or an adjustment signal for reconstruction of the input signal using the first encoded signal. In this way, codec-type inaccuracies can be corrected.

The residual signal or the adjustment signal may comprise taking a difference between the input signal and the second processed signal.

The input signal may be down-sampled, and the down-sampling may reduce a resolution of the input signal.

Optionally, the input signal may be down-sampled before the input signal is converted from a first colour space to a second colour space and up-sampling the decoded signal before converting the decoded signal from the second colour space to the first colour space. In this way, the process of converting from a first colour space to a second colour space is performed over a smaller number of pixels and can therefore be done more quickly. The size of the colour conversion can also be reduced compared to a conversion at full resolution. Furthermore, any artefacts introduced as a result of the conversion can be efficiently corrected.

Optionally, the input signal may be down-sampled after converting the input signal from a first colour space to a second colour space and up-sampling the decoded signal after converting the decoded signal from the second colour space to the first colour space.

The step of converting the input signal from a first colour space to a second colour space may comprise one or more of the following operations: mapping a colour space (e.g. RGB to YCbCr/LMS); changing a sampling pattern (e.g. 4:4:4 to 4:2:2); converting from a first bit depth to a second bit depth, wherein the first bit depth is greater than the second bit depth; changing a dynamic range of the luminance component; changing the colour gamut; changing the electro-optic transfer function model; changing the lowest luminance level (e.g. the black level); changing the highest luminance level (e.g. the white level); and tone mapping.

The input signal may comprise a plurality of frames in succession, and each successive frame may be encoded by the first encoding module. In this way, there is a reduced need for frame counting and signalling, and, additionally, the need for managing intra-coding reference frames is much reduced.

Optionally, the step of converting the input signal from a first colour space to a second colour space is non-linear.

Optionally, the step of converting the input signal from a first colour space to a second colour space, to produce a first processed signal, is non-predictive. In this way colour space conversions may be performed in a stand-alone manner without a need for the calculation of additional prediction information, that more easily facilitates modular replacement of conversion functions. Also, in this way, the computational burden at decoders is reduced, and more backwards compatibility may be realised.

According to a second aspect of the invention, there is provided a method of decoding a signal. The method comprises using a first decoding module to decode a first encoded signal to generate a first decoded signal. A second decoding module is used to decode a second encoded signal to generate a second decoded signal. The first decoded signal is then processed by converting the first decoded signal from a first colour space to a second colour space, to produce a processed decoded signal. The second decoded signal is then processed by the second decoding module to generate a combined decoded signal. In this way, one or more of signal improvements, reduced bandwidth potential, and backwards compatibility are provided.

Optionally, if a display is capable of displaying a signal only in the first colour space, the combined decoded signal may be converted back to the first colour space.

The second encoded signal may contain additional ancillary data for reconstruction of the input signal using the first encoded signal.

The ancillary data may also contain metadata for reconstructing a high dynamic range signal, providing greater granularity and adaptation to scene changes.

The second encoded signal may comprise a residual signal or an adjustment signal for reconstruction an original input signal using the first encoded signal.

The residual signal or the adjustment signal may be added to the processed decoded signal to generate the combined decoded signal. In this way, codec-type inaccuracies can be corrected.

Optionally, the first decoded signal may be up-sampled prior to converting the first decoded signal from a first colour space to a second colour space. In this way, the colour conversion may be performed more rapidly at a lower resolution.

Optionally, the processed decoded signal may be up-sampled. In this way, the processed decoded sample may be converted to a higher level of quality.

Optionally, the up-sampling may be combined with range adjustment. In this way, touching memory buffers multiple times can be avoided, thus reducing both memory accesses and necessary memory bandwidth.

The step of converting from a first colour space to a second colour space may comprise one or more of the following operations: mapping a colour space (e.g. RGB to YCbCr/LMS); changing a sampling pattern (e.g. 4:4:4 to 4:2:2); converting from a first bit depth to a second bit depth, wherein the first bit depth is greater than the second bit depth; changing a dynamic range of the luminance component; changing the colour gamut; changing the electro-optic transfer function model; changing the lowest luminance level (e.g. the black level); changing the highest luminance level (e.g. the white level); and tone mapping.

The step of converting from a first colour space to a second colour space may comprise converting from a non-high dynamic range signal to a dynamic range signal.

The step of converting from a first colour space to a second colour space by converting from a non-high dynamic range signal to a dynamic range signal may also comprise sensing if a connected display is unable to display the high dynamic range signal, and if so, outputting the first decoded signal. In this way, backwards compatibility is provided.

The first encoded signal may comprise all frames of the combined decoded signal. Each frame in the first encoded signal may be decoded by the first decoding module and provide a base version of the combined decoded signal. The second encoded signal may comprise enhancement information for each frame of the base version.

Optionally, the step of converting the input signal from a first colour space to a second colour space is non-linear.

Optionally, the step of converting the input signal from a first colour space to a second colour space, to produce a first processed signal, is non-predictive. In this way colour space conversions may be performed in a stand-alone manner that facilitates modular replacement of conversion functions.

There is provided a computer program adapted to perform the methods of encoding and decoding an input signal as detailed above.

There is provided a computer-readable storage medium or data carrier comprising the computer program adapted to perform the methods of encoding and decoding an input signal.

There is provided a data processing apparatus comprising a processor and memory, the apparatus being adapted to carry out the signal encoding and decoding methods outlined above.

DESCRIPTION

Brief Description of the Figures

The invention shall now be described, by way of example only, with reference to the accompanying drawings, in which.

DETAILED DESCRIPTION

Figure 1:
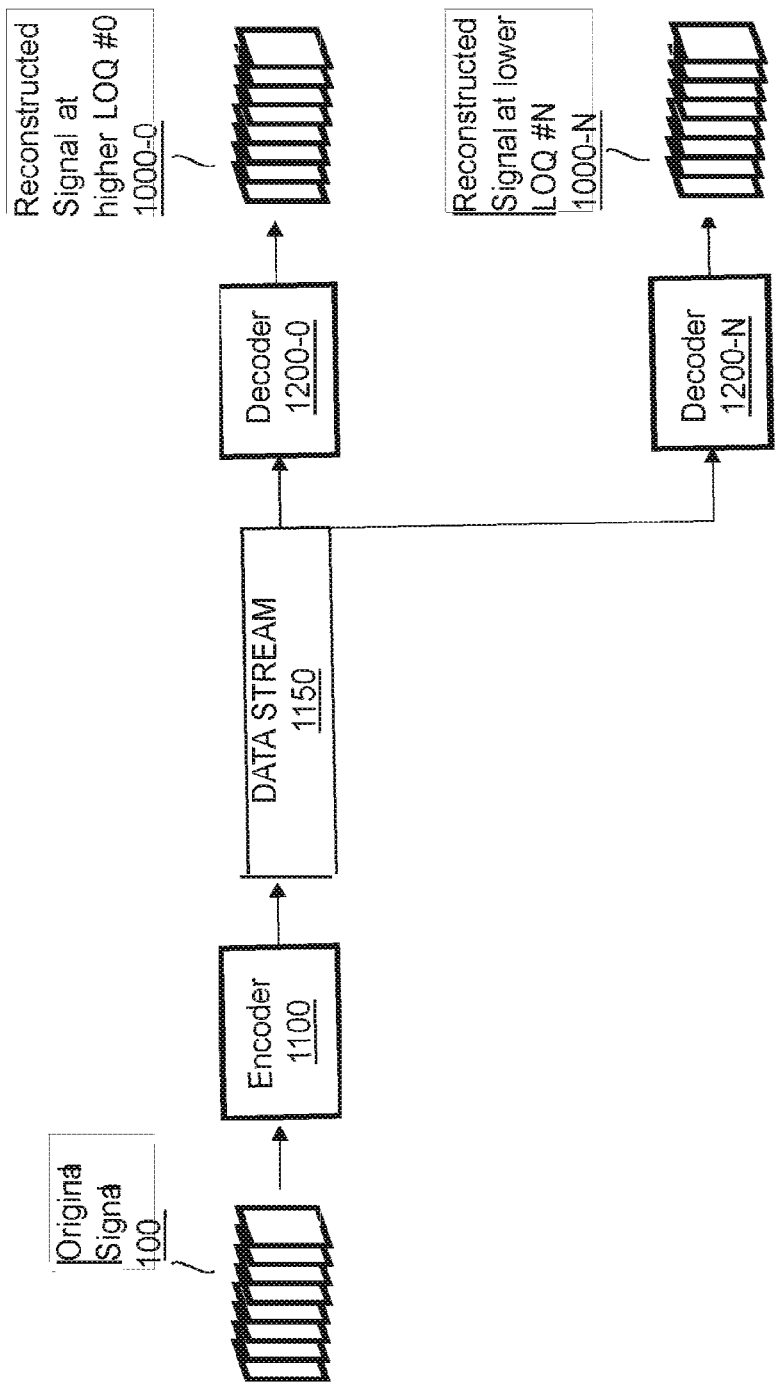
FIG. 1 shows an exemplary system for encoding and decoding a signal.

Some definitions are given below to aid the reader of this document in relation to the terminology used.

As non-limiting examples, a signal can be an image, an audio signal, a multi-channel audio signal, a video signal, a multi-view video signal (e.g., 3D video), a volumetric signal (e.g., medical imaging, scientific imaging, holographic imaging, etc.), a volumetric video signal, or even signals with more than four dimensions.

Broadly speaking, video is defined as the recording, reproducing, or broadcasting of moving images. A video signal consists of a sequence of individual frames, each of which may be individually compressed through encoding/decoding methods.

Encoding is a process that involves converting information from one format into another format to allow efficient transmission from one source to another, or storage of that information. The information to be encoded may be raw video, which often contains large amounts of data that cannot be feasibly transmitted in its original form. As such, the raw video is encoded, or compressed, so that the raw video content requires a reduced amount of space for transmission. Decoding is the reverse process of encoding, and involves converting (decompressing) the encoded information back into its original pre-transmission format. Encoding and decoding may be lossless or lossy.

For video signals, and in particular signals that relate to HDR video, consumer displays that have limited colour volume (i.e. do not provide peak brightness/contrast and colour gamut required by the relevant HDR standards), SMPTE defines metadata for describing the scenes as they appear on the mastering display. SMPTE ST 2086 "Mastering Display Colour Volume Metadata Supporting High Luminance and Wide Colour Gamut Images" describes static data such as MaxFALL (Maximum Frame Average Light Level) and MaxCLL (Maximum Content Light Level). SMPTE ST 2094 "Content-Dependent Metadata for Color Volume Transformation of High Luminance and Wide Color Gamut Images" includes dynamic metadata that can change from scene to scene. This includes ST 2094-10 (Dolby Vision format), Colour Volume Reconstruction Information (CVRI) SMPTE ST 2094-20 (Philips format) and Colour Remapping Information (CRI) defined in ST 2094-30 (Technicolor format), and HDR10+ST 2094-40 (Samsung format). Ancillary data may contain or comprise the metadata described here, and additional enhancement information such as residual information may be part of any ancillary data.

Video content may be transmitted at a prescribed level (or levels) of quality, which may be defined, for example, by a particular spatial resolution or frame rate or peak signal-to-noise-ratio (PSNR). The level of quality may be restricted by the constraints of the transmission channel carrying the video content. As an example, existing decoding hardware may decode a signal up to a given resolution and/or frame rate (first level of quality). One or more additional levels of quality may be reconstructed using computational decoding methods. Legacy decoding devices that are unable to be updated so as to perform decoding of a level of quality higher than the first level of quality will simply decode the signal at the first level of quality and ignore the additional enhancement data.

The bit depth of a signal relates to the number of bits used to communicate a particular value. In video, bit depth (sometimes referred to as colour depth) relates to the colour components (e.g. luma Y and chroma Cb and Cr) representing pixels within an image, and, specifically, defines the number of luminance levels and the number of colours that can be stored in an image. Images where the bit depth is less than or equal to 8-bits are considered images of standard dynamic range, and images where the bit depth is greater than 8-bits may be considered to be images with high dynamic range, or enhanced dynamic range.

Image resolution may be considered to be a measurement of how much information is available. Video resolution is in essence a basic measurement of how much information is visible for a particular image. Spatial video resolution is typically defined by the number of pixels that can be displayed in each dimension on a display device and is usually provided as the width of the display device against the height of the display device. For example, a full HD signal is represented as 1920×1080 pixels, or more usually and simply 1080p. A UHD signal is may typically have a frame resolution of 3840×2160 pixels, and is more usually and simply referred to as a 4K resolution. A UHD signal may also have 8K resolution (e.g. 7680×4320 pixels). Similarly, there may be additional temporal resolution in a video signal, for example, the video signal may be available in a variety of frame rates, such as at 25, 30, 50, 60, 100 and 120 frames per second.

The process of upsampling involves converting a lower resolution version of a signal, or sequence of signals, to a higher resolution version of the signal to enhance the quality of the signal. Upsampling produces an approximation of the sequence that would have been obtained by sampling the signal at a higher rate, and is typically performed on encoded data by a decoder. Upsampling can be performed spatially (i.e. on the pixel resolution) or temporally (i.e. on the frame rate).

Conversely, downsampling produces an approximation of the sequence that would have been obtained by sampling the signal at a lower rate, resulting in a lower resolution version of the signal.

A colour space may be defined as a mathematical representation of a set of colours that allows for specific colours to be reproduced. Two of the most commonly used colour spaces for digital image and video representation are RGB (red/green/blue) and YCrCb (luminance/red chrominance/blue chrominance). A colour space may be more widely defined as being defined by one or more of ITU-R Recommendations BT 709, 2020, 2100, 2390 which provide more detail of a colour definition, including a specification for how image elements such as a pixel are represented in a video, and in some cases also cover and define parameters of the following attributes of a signal: a sampling pattern (e.g. 4:4:4 to 4:2:2); bit depth; a dynamic range of the luminance component; the colour gamut; the electro-optic transfer function model used; the lowest luminance level (e.g. the black level); and the highest luminance level (e.g. the white level).

It should be noted that the examples below are usefully performed on a signal having video content, the video content comprising frames, with any processing being performed on each and every frame within each video segment (i.e. on successive frames). In some examples some frames may be processed differently, but there is an advantage to processing all frames in the same way in that there is a reduced need for frame counting and signalling, and the need for managing intra-coding reference frames is much reduced.

FIG. 1 shows an exemplary system for encoding and decoding a signal as described in this patent application. In particular, an original signal 100 is encoded by encoder 1100. A data stream 1150 is generated by said encoder and transmitted to decoders 1200-0 to 1200-N. The data stream may be split and portions of the data stream 1150 are sent to the decoders. Each decoder decodes its respective portion of the data stream and obtain reconstructed signal at level #0 to reconstructed signal at level #N. The final signal is obtained by processing and combining said different reconstructed signals at different levels to obtain one single signal. Different decoders can receive different portions of the data stream and reconstruct signals at different levels of quality. A decoder may decode and output different levels of quality.

Figure 2:
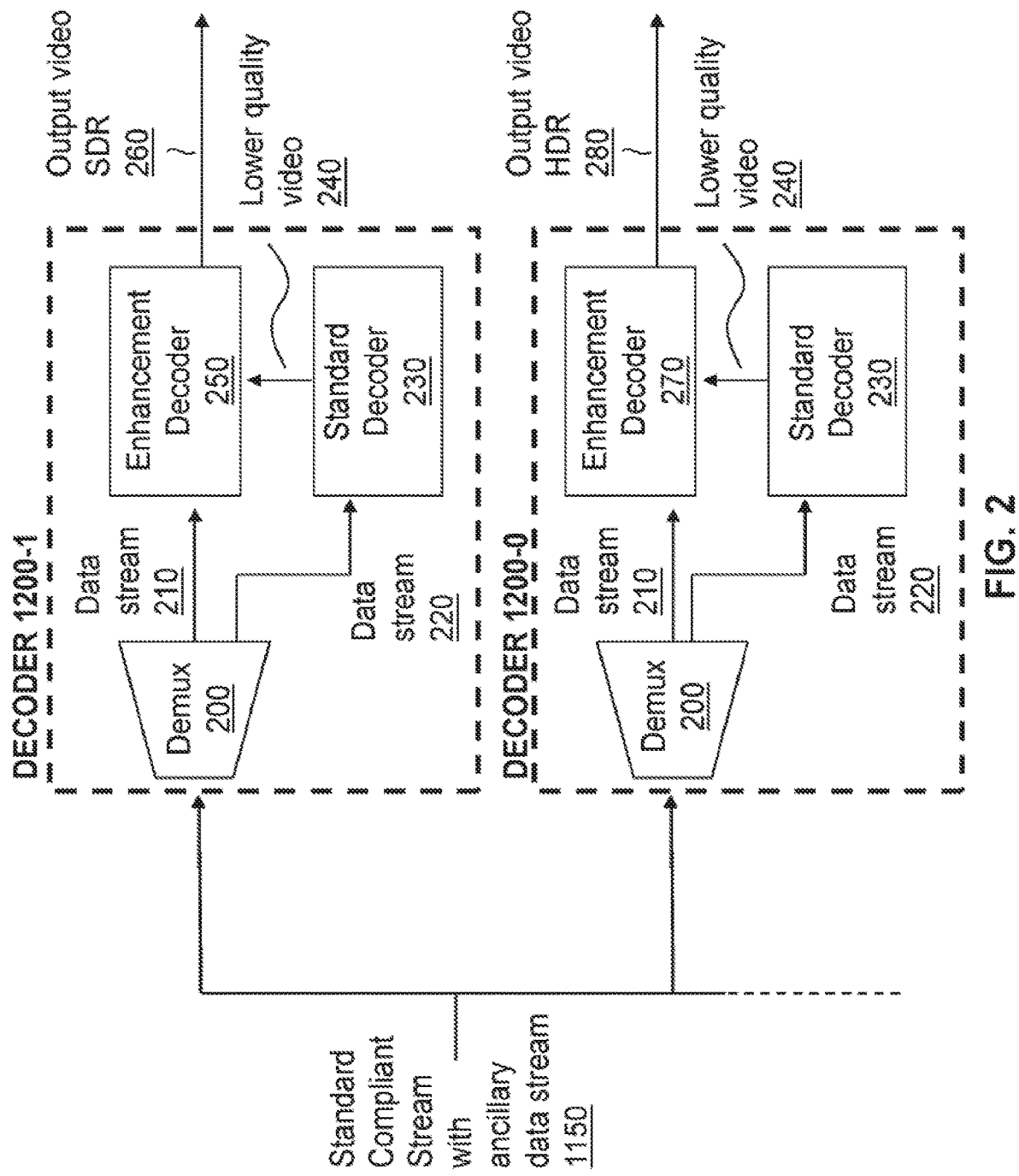
FIG. 2 shows an example of a decoding system in accordance with a first example.

FIG. 2 shows an example of a decoding system as described in this patent application. In particular, a data stream 1150 is received by multiple decoders 1200-0 and 1200-1. The data stream 1150 may be formed of a standard compliant data stream (e.g., compliant with standard codecs such as AVC, HEVC, VVC, others and non-standard codecs) and an ancillary data stream. The first sub-stream is fed to a first decoder 1200-1 which splits the data stream into data stream 220, which is fed to standard decoder 230 to produce a lower quality video 240. The lower quality video 240 is processed together with data stream 210 by enhancement decoder 270 to produce an output video SDR 280, that is, a video output having a SDR. In this case, the output video SDR could correspond either to the lower quality video 240 after processing (e.g., up-sampling) but without any additional information added on top by data stream 210 (e.g., in the case decoder 1200-1 is not capable of interpreting data stream 210), or to the lower quality video 240 after processing it with the additional information derived from data stream 210 (e.g., a combined stream), and then the combined stream is down-sampled to SDR resolution in order, for example, to adapt to a TV or display only capable of displaying an SDR video. The second sub-stream is fed to a second decoder 1200-0 which splits the data stream into data stream 220, which is fed to standard decoder 230 to produce a lower quality video 240. The lower quality video 240 is processed together with data stream 210 by enhancement decoder 250 to produce an output video HDR 260.

In FIGS. 1 and 2, a data stream is received at the decoding module 1200-0, 1200-N. The data stream could be a stream comprising data that is compliant with a standard such as a protocol standard (e.g., DASH, HLS, etc.) and/or a coding standard (e.g., an MPEG standard such as AVC, HEVC, VVC, etc., or other codec formats such as VP9, AV1, VC-6, etc.). The data stream is then split by a de-muxing module into two (or more) separate streams. A first stream is passed to a decoding module which decodes in accordance with a first decoding scheme, such as a standard based scheme (e.g., AVC, HEVC, VVC, VC-6, etc.) or a non-standard based scheme (e.g., VP9, AV1, etc.). The output of the first decoding module (e.g., a first decoded video signal) is passed to a second decoding module which decodes in accordance with a second decoding scheme. This second decoding module also receives some ancillary data stream which, when processed with the output of the first decoding module, produces an enhanced decoded video signal.

In one example, the first decoding scheme is the same as the second decoding scheme.

In another example, the first decoding scheme is different from the second decoding scheme. The second decoding scheme may also include operations such as up-sampling, residual dequantization, residual transform, addition of residuals from a motion-compensated frame buffer, post-processing, etc. The residual information is, for example, a difference signal generated by comparing a reference signal to a reconstructed version of the reference signal, as will be apparent from the further description below.

In some examples, the ancillary data stream also contains some metadata (static or dynamic) such as that needed for reconstructing an HDR signal. This metadata can be processed by the second decoding module along with the output of the first decoding module and the other data in the ancillary data stream, so as to produce an enhanced HDR decoded video signal. The metadata may include range information for specifying the range of HDR information, and may contain information for ensuring the HDR signal is properly rendered on a display, on a title-by-title basis, or on a scene-by-scene or frame-by-frame basis. The ancillary data stream may also contain the residual information.

In some examples, the first decoding module reconstructs a lower bit depth (e.g., 8-bit) signal, and the second decoding module transforms the signal into a higher bit depth (e.g., 10-bit) one, amenable for HDR. In one example, the second decoding module is able to sense if the decoding device is unable to display higher bit-depth (e.g., 10-bit) HDR pictures, in which case it decodes and displays a lower bit depth (e.g., 8-bit) signal.

In some examples, the second decoding module combines the processing necessary to adjust the value ranges with the other processing necessary to reconstruct the output signal from the first (lower) level of quality. In one example, an upsampling operation is combined with range adjustment, so as to avoid touching memory buffers multiple times, thus reducing both memory accesses and necessary memory bandwidth. For example, the other processing includes upsampling and/or addition of residual data to convert from an upsampled lower level of quality to a higher level of quality.

In some examples, the first decoding module reconstructs a lower resolution rendition of the signal. The HDR adjustment is then applied by the second decoding module to a lower resolution reconstruction of the signal. Following that adjustment, the second encoding module further processes the signal and the other ancillary data so as to obtain a higher resolution and/or higher quality signal.

In some examples, the encoder receives a high-bit-depth (e.g., 10-bit) HDR source signal. The encoder downsamples the source signal and adjusts the downsampled rendition so as to obtain a low bit depth (e.g., 8 bit) SDR signal. The SDR signal is processed with a first codec to obtain a first encoded data set. The decoded output of the first codec is converted into a higher bit depth HDR signal, which is then processed by a second encoder module so as to produce a second encoded data set, containing additional ancillary data to be used to reconstruct a full-resolution reconstructed rendition of the original source signal.

In some examples, the encoder processes the high-bit-depth HDR signal before or after the down-sampling operation. For example, the high-bit-depth HDR signal may be represented in a colour space such as that defined in ITU-R Recommendation BT.2020, ITU-R Recommendation BT.2100 or similar, which are incorporated herein by reference. By way of background, Rec. 2100 includes two transfer function definitions that may be used for HDR signals, namely Perceptual Quantizer (PQ), which was previously standardized as SMPTE ST 2084 (incorporated herein by reference), and Hybrid Log-Gamma (HLG), which was previously standardized as ARIB STD-B67 (incorporated herein by reference). The PQ scheme with 10 bits of colour bit depth has also been called HDR10.https://en.wikipedia.org/wiki/Rec.2020-cite note-HDRCompatible-CEA2015-49 Similarly, the HLG scheme with 10 bits of colour bit depth has been called HLG10.

The HDR signal may be processed before or after the down-sampling to convert it to a different colour space such as that defined in ITU-R Recommendation BT.709 or similar (which are incorporated herein by reference). For example, this conversion can be done in a way that the resulting signal is a low-bit-depth (e.g., 8-bit) SDR signal. This signal may then be used by the first encoding module as described above.

Conversely, the decoded output of the first codec is converted from a first colour space (e.g., BT.709) to a second colour space (e.g., BT.2020 or BT.2100) before or after an upsampling operation to produce a high-bit-depth HDR signal (e.g., 10-bit). This signal can then be processed by the second encoder module as described above.

In some examples, the first decoding module receives a first encoded signal and reconstructs a lower resolution rendition of the signal, which is for example also a low-bit-depth (e.g., 8-bit) SDR signal. The SDR signal may be represented in a first colour space (e.g., BT.709) and is converted to a second colour space (e.g., BT.2020 or BT.2100) before or after an upsampling operation to a higher resolution rendition, thus generating an HDR signal at, for example, a high-bit-depth (e.g., 10-bit) at a higher resolution. A second encoded signal is decoded by the second decoding module to produce an adjustment signal or a residual signal. The HDR signal may be then further processed by the second decoding module to produce an adjusted HDR signal using the adjustment signal. Following that adjustment, the second encoding module further processes the signal and the other ancillary data so as to obtain a higher resolution and/or higher quality signal.

The conversion can be performed using known methods in the art such as those included in the ITU-R Recommendation BT.2407 and ITU-R Recommendation BT.2087, which are incorporated herein by reference. There are also look-up-table (LUTs) and/or other known methods (e.g., Report ITU-R BT.2408-0 or HLG Look-Up Table Licensing by the BBR R&D, both incorporated herein by reference) which are used to support conversion between colour spaces.

In another example, the source signal is adjusted and converted into a lower bit depth SDR signal, e.g. by performing a colour conversion, before proceeding with the downsampling process.

Figure 3:
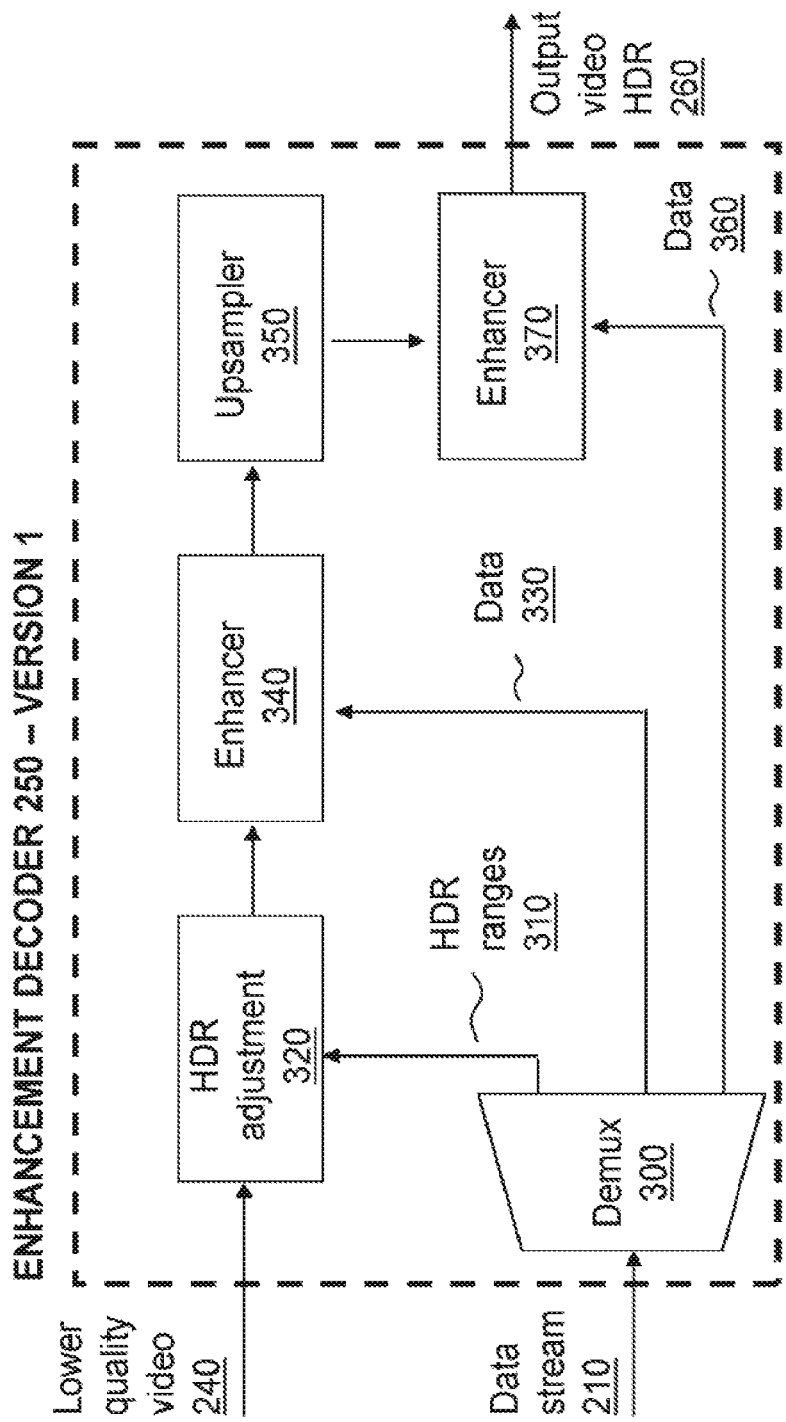
FIG. 3 shows an example of a decoder in accordance with a first variation of the first example.

FIG. 3 shows an example of a decoder in accordance with a first example. Data stream 210 is split by a demux 300 into three different streams, HDR stream, or range(s) data, 310, a first set of enhancement data 330 and a second set of enhancement data 360. The HDR ranges data 310 are fed to an HDR adjustment module 320 and combined with lower quality video 240 to generate a first output stream. This first output stream is fed to a first enhancer 340 and processed together with the first set of enhancement data 330 to generate a second output stream. The second output stream is finally fed to upsampler 350 and the up-sampled stream is processed with the second set of enhancement data 360 by second enhancer 370 to output a video HDR output 260. Note that if the first set of enhancement data 330 is not present, then the first output stream is fed directly to up-sampler 350 with the other steps remaining unchanged.

Figure 4:
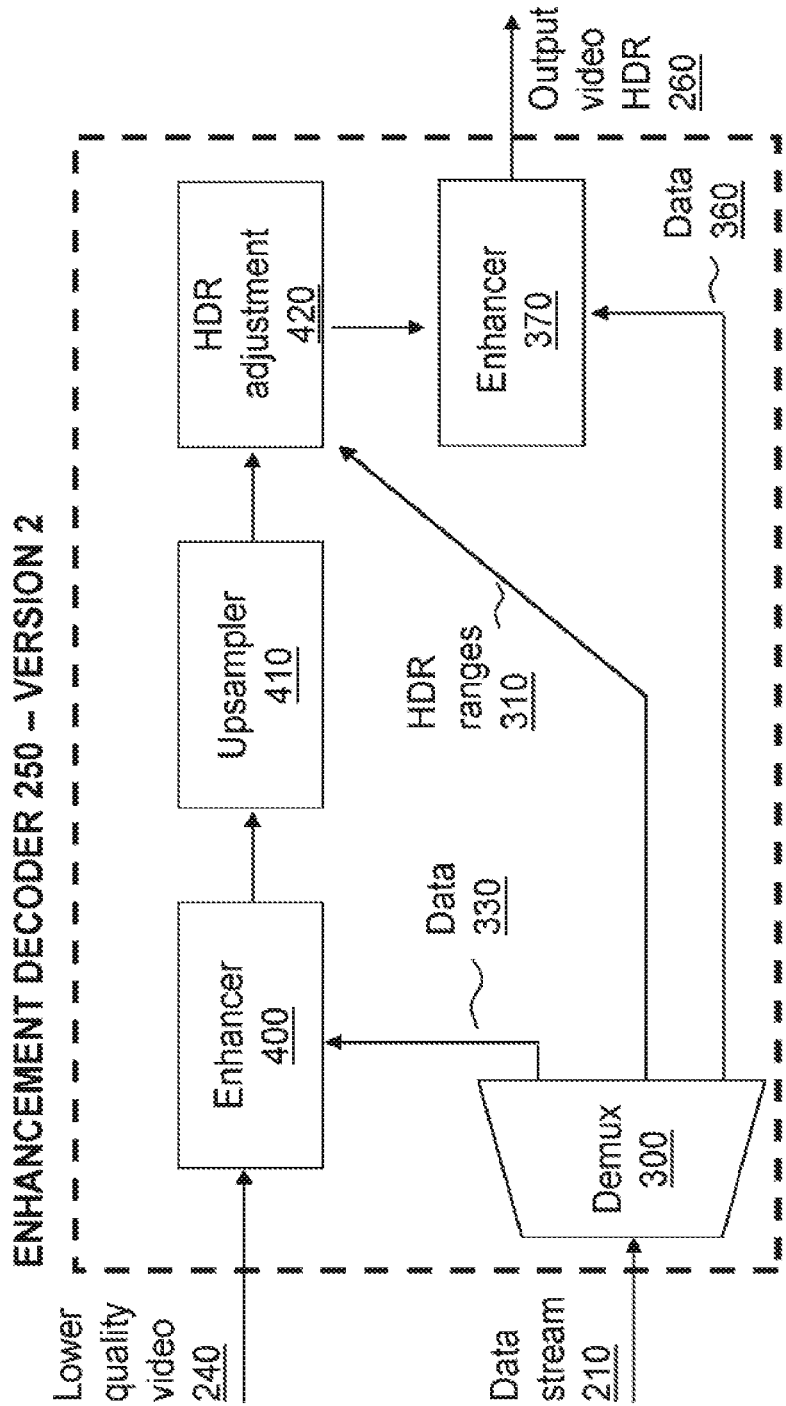
FIG. 4 shows an example of a decoder in accordance with a second variation of the first example.

FIG. 4 shows an example of a decoder in accordance with a second example. The second example may be seen as an alternative implementation of the first example. Data stream 210 is split by a demux 300 into three different streams, HDR stream 310, a first set of enhancement data 330 and a second set of enhancement data 360. The first set of enhancement data 330 is fed to a first enhancer 400 and combined with lower quality video 240 to generate a first output stream. This first output stream is fed to up-sampler 410 to generate an up-sampled version which is then fed into HDR adjustment module 420 together with HDR stream data 310 to generate a second output stream. The second output stream is processed with the second set of enhancement data 360 by second enhancer 370 to output a video HDR output 260. Note that if the first set of enhancement data 330 is not present, then the lower quality video 240 is fed directly to up-sampler 410 with the other steps remaining unchanged.

Figure 5:
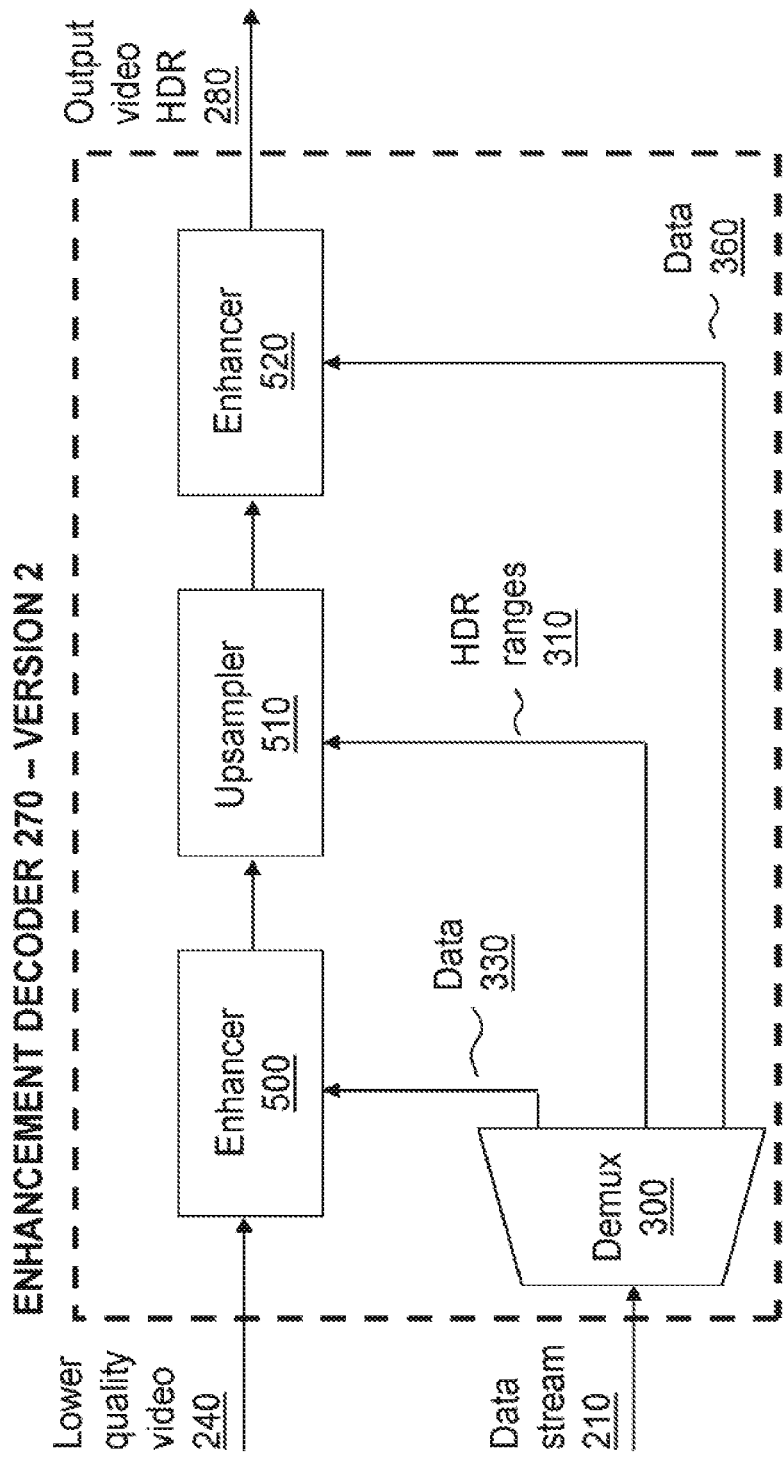
FIG. 5 shows an example of a decoder in accordance with a third variation of the first example.

FIG. 5 shows an example of a decoder in accordance a third example. The third example again may be implemented as an alternative to one or more of the first and second examples. Data stream 210 is split by a demux 300 into three different streams, HDR stream 310, a first set of enhancement data 330 and a second set of enhancement data 360. The first set of enhancement data 330 is fed to a first enhancer 500 and combined with lower quality video 240 to generate a first output stream. This first output stream is fed to up-sampler 510 and processed together with HDR range data 310 to generate a second output stream. The second output stream is processed with the second set of enhancement data 360 by second enhancer 520 to output a video output 280. In this case, the upsampling and the HDR adjustment are combined in one operation.

In the examples of FIGS. 3, 4 and 5, if one or more of the HDR range data 310, the first set of enhancement data 330 and the second set of enhancement data 360 are absent from the data stream 210 then then corresponding enhancement or adjustment operations that use this data may also be omitted. In these cases, in one portion of the de-muxed data stream is not present then the receiving processing entity (e.g. one of the enhancers or the HDR adjustment module) may be configured to pass through a received video stream. In certain cases, an enhancement decoder may be configured to output SDR video by omitting an HDR adjustment operation, e.g. if a display device is not capable of rendering HDR video. If output video is required at a lower resolution, then the up-sampler and the second enhancer may be disabled. Different video outputs may be configured by selectively controlling the operation of the components of the enhancement decoder 250.

Figure 6:
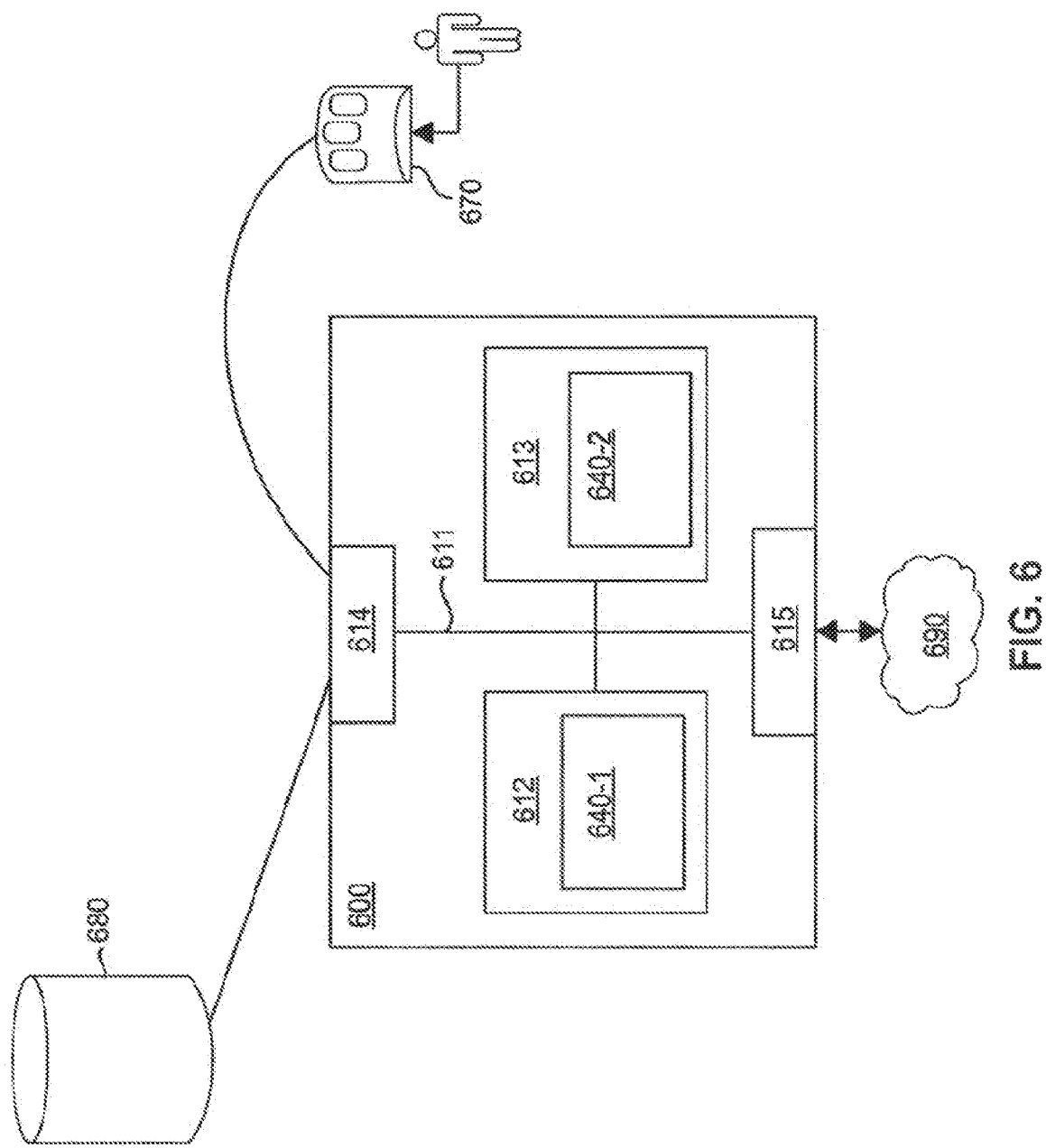
FIG. 6 shows an example of a computer system.

FIG. 6 shows an example of a computer system 600 as described in this patent application. The computer system 600 is shown including multiple processors over which the above decoders can be implemented. The computer system comprises a systems bus 611, a computer-readable storage medium 612, one or more processors 613, an I/O interface 614, and a communication interface 615. FIG. 6 shows an input device 670 and a storage device 680 communicatively coupled to the I/O interface 614 and the computer system 600 communicatively coupled to one or more networks 690 via the communication interface 615. The computer-readable storage medium 612 stores a signal processor application 640-1, which may implement at least the enhancement decoders described above. The signal processor application 640-1 may be executed by the one or more processors 613 as one or more signal processor processes 640-2. It is particularly advantageous to be able to distribute the decoding over multiple processors to enable an element of parallel processing. The encoding and decoding systems and methods described herein enable the effective use of parallel processing.

Figure 7:
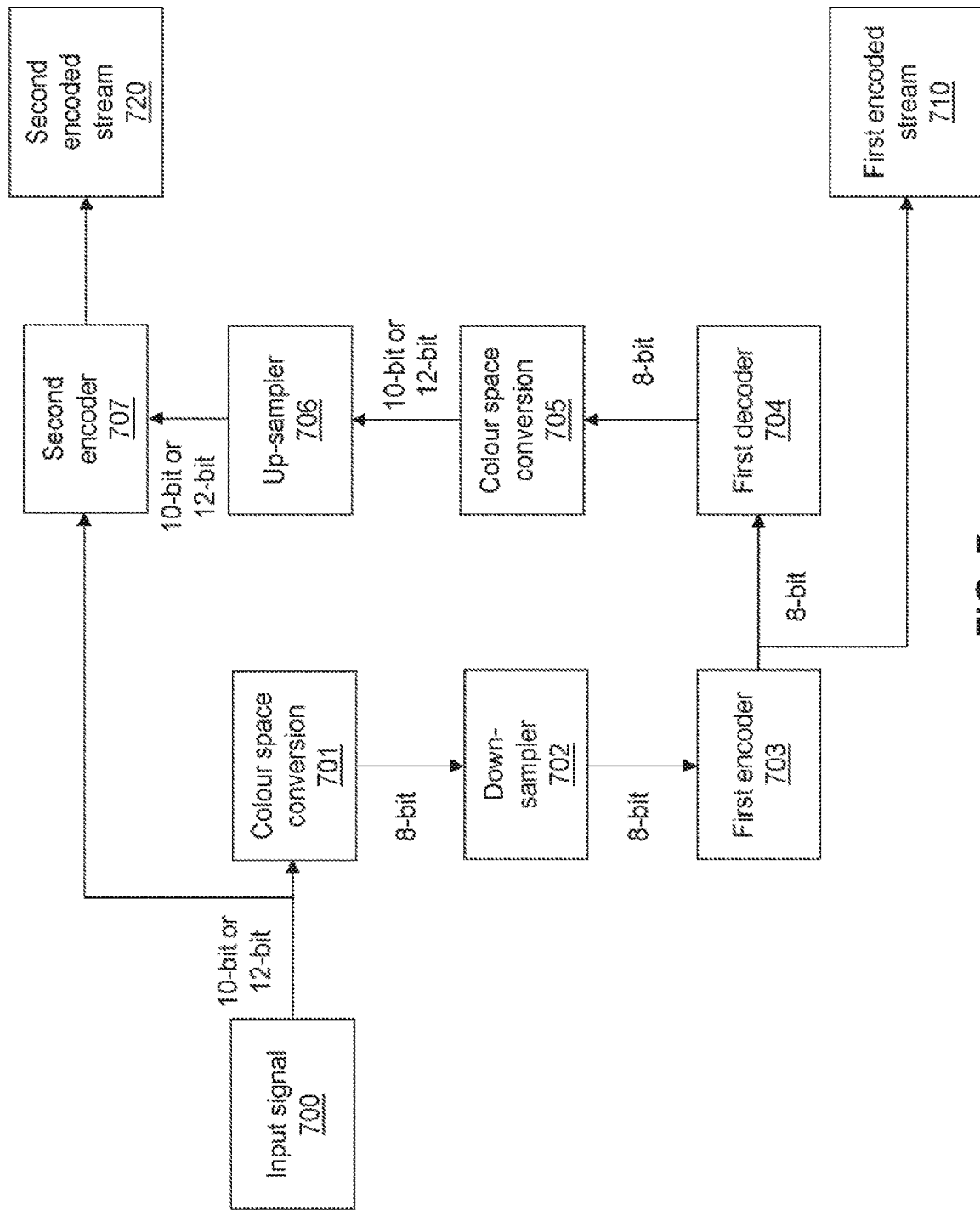
FIG. 7 shows an example of an encoding system and method in accordance with a second example.

FIG. 7 shows an example of an encoding system and method as described in this patent application. An input signal 700, for example a high-bit-depth (e.g., 10-bit or 12-bit, or others, for example 16-bit or even higher) HDR-type signal, is received at an encoding system. The input signal is then converted via a first colour conversion module 701 from a first colour space (e.g., BT.2020 or BT.2100) to a second colour space (e.g., BT.709). The first colour space and the second colour space are different. During the conversion, the bit-depth of the signal may be reduced from the original high-bit-depth to a low-bit-depth (e.g., 8-bit) SDR signal. The SDR signal is then processed by a down-sampler 702 to pass from a higher resolution to a lower resolution. The output signal is then processed by the first encoder 703. The first encoder 703 is, in one example, a standard-based known encoding module based on an MPEG standard or the like, and is, in one example, a widely used encoding standard that a significant portion of end user decoders will be compatible with, to allow for wide backwards compatibility of this technique.

In certain other examples, the conversion and down-sampling can be done in reverse order, i.e. first the down-sampling and then the conversion. In another example, the down-sampling operation is not done and therefore the converted signal is passed straight to the first encoder 703. In this most basic case, when the down-sampling operation is not done, there is no resolution change.

The output of the first encoder 703 is a first encoded stream 710. This may also be thought of as a base layer output which as mentioned above is widely decodable, and can present a rendition of the input signal to a user in a different colour space from the input signal 700 (and optionally at a lower resolution). The different colour space may be any one or more of a number of different formats or defined by any one or more of other constraints on the signal. In one example the colour space may change from an RGB colour space to a YUV colour space, or from an HDR-type colour space to an SDR-type colour space.

The output of the first encoder 703 is further decoded by first decoder 704, and the output decoded signal is then passed to a second colour conversion module 705 to convert the decoded signal back from the second colour space to the first colour space. The second colour conversion module 705 may use an inverse process to that used by the first colour space conversion module 701. There is an advantage in using an inverse process, or something else, without any information flowing from the first colour conversion module 701 to the second colour conversion module 705, in that no metadata is needed or other indication of how to perform the colour space conversion 705. As will become apparent, a higher-level encoding process offers a way to correct for any inaccuracies in the colour space conversion. Following on, there is no need to try to predict the signal accurately or at all in the first colour space because of the higher-level encoding.

Additionally, during the conversion performed by the second colour conversion module 705, the bit-depth of the signal may be increased from the low-bit-depth (e.g. 8-bits) to the high-bit-depth (e.g. 10-bits, 12-bits, or higher) to generate an HDR-type signal. The HDR-type signal, or simple colour converted signal, is then up-sampled by 706 and the resulting up-sampled HDR-type signal is processed together with the original input signal by the second encoder 707 to generate a second encoded stream 720.

The processing performed by the second encoder 707 may produce a residual signal that represents a difference between the input signal 700, as a reference signal, and the up-sampled HDR-type signal, as a reconstruction of the original signal 700. The residual signal may be used to adjust a corresponding up-sampled HDR-type signal at the decoder to reconstruct the original input signal 700 or a close approximation thereof at a decoder. In this case, the residual signal accounts for any artefacts or other signal discrepancies introduced by the first encoder 703 and first decoder 704, in other words the residual signal corrects for codec-type inaccuracies. Additionally, the residual signal corrects for any artefacts or signal discrepancies introduced by the colour space conversion, performed by both the first and second colour space conversion modules 701 and 705. Finally, when used, the residual signal corrects for any discrepancies introduced by the down-sampler 702 and up-sampler 706. This allows for design decisions to be taken to use simpler or more efficient versions of the aforesaid. The residual signal may be encoded using known techniques.

In one example, the conversion and up-sampling can be done in reverse order, i.e. first the up-sampling and then the conversion. In another example, the up-sampling operation is not done and therefore the converted signal is passed straight to the second encoder 707, where the second encoder 707 produces a residual signal in the same was as before, but this time without a resolution change.

As can be seen from FIG. 7, the encoder and associated encoding method produces a first encoded stream 710 which may be encoded using a standard-compliant or other encoding means, and which represents a signal at a first, or base, level of quality. The encoder and associated encoding method also produces a second encoded stream 720, or enhancement stream, which may comprise residual information for adjusting or correcting a colour converted version of the signal at the base level of quality, derived from the first encoded stream 710 at a decoder. There may be a change in resolution in addition to the colour change. All of these features individually and/or collectively give rise to a composite signal that may allow colour space conversions, such as but not limited to HDR to SDR conversions, to be encoded and decoded on top of a widely decodable version of an encoded input signal, thus allowing for one or more of signal improvements, reduced bandwidth potential, and backwards compatibility. The architecture and structure may allow for efficiencies over the prior art.

Figure 8:
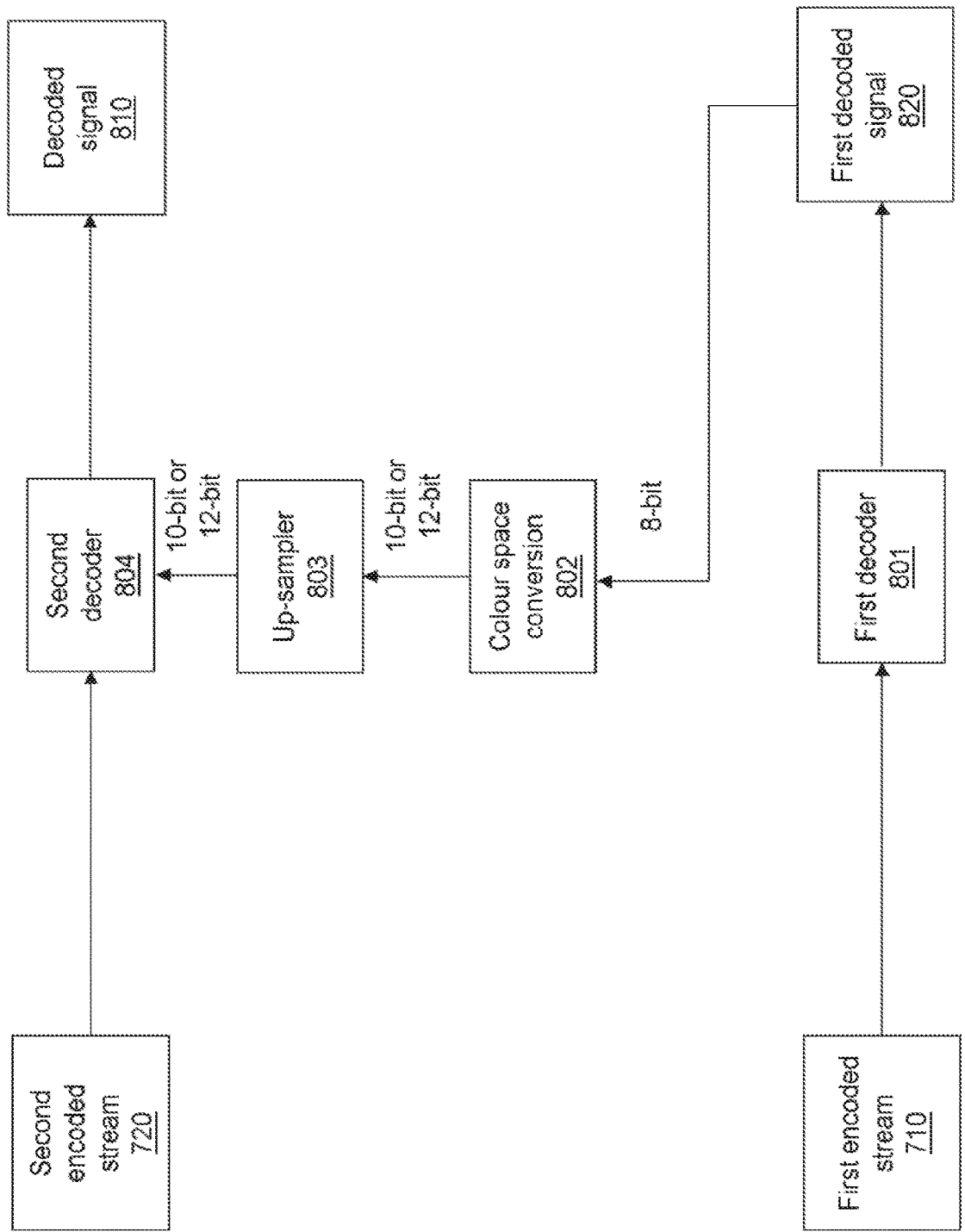
FIG. 8 shows an example of a decoding system and method in accordance with the second example.

FIG. 8 shows an example of a decoding system and method as described in this patent application. A first decoder 801 receives the first encoded stream 710 and decodes it to generate a decoded signal 820 in the second colour space, which may be an SDR-type signal at the low-bit-depth (e.g. 8-bits). The decoded signal 820 is then passed to a colour conversion module 802 to convert the decoded signal back from the second colour space to the first colour space. During the conversion, the bit-depth of the signal may be increased from the low-bit-depth (e.g. 8-bits) to the high-bit-depth (e.g. 10-bits, 12-bits or higher) to generate an HDR-type signal which is a reconstruction of the original HDR-type signal at the lower resolution. The converted signal (first colour space and/or HDR-type) is then up-sampled by up-sampler 803 and the resulting up-sampled signal is processed by a second decoder 804 together with the second encoded stream 720 to generate a final decoded signal 810 (e.g. a signal that is in first colour space and/or of an HDR-type, with correction). Here, the second encoded stream 720 may contain residual information which may be combined (e.g. summed) with the up-sampled HDR-type signal to reconstruct the original input signal 700 (e.g. as received at the encoder) or a close approximation thereof. Alternatively, in another example, the colour conversion and up-sampling can be done in reverse order, i.e. first the up-sampling and then the colour conversion. In another example, the up-sampling operation 803 is not done and therefore the converted signal is passed straight to the second decoder 804. This occurs in the base case when there is no resolution change.

The decoding system of FIG. 8 produces the first decoded signal 820 which is in the second colour space, and which may be an SDR-type signal. The first decoded signal 820 is available for outputting to a display, and in particular and advantageously to a display which is not capable of utilising the information available when the first decoded signal 820 is converted into the second colour space. The decoding system of FIG. 8 also produces the final decoded signal 810 which is in the first colour space, and may be an HDR-type signal, and which is corrected by the residual signal in the second encoded stream 720. The final decoded signal 810 is available for outputting to a display that is compatible with the first colour space. The final decoded signal 810 may be at an additional level of quality when compared to the first decoded signal 820 (e.g. enhanced colour and/or resolution). The decoding system may determine what capability any connected display has, and accordingly choose whether to create the final decoded signal 810, whether to use the first decoded signal 820 and/or whether to convert the final decoded signal back to a compatible format.

Figure 9:
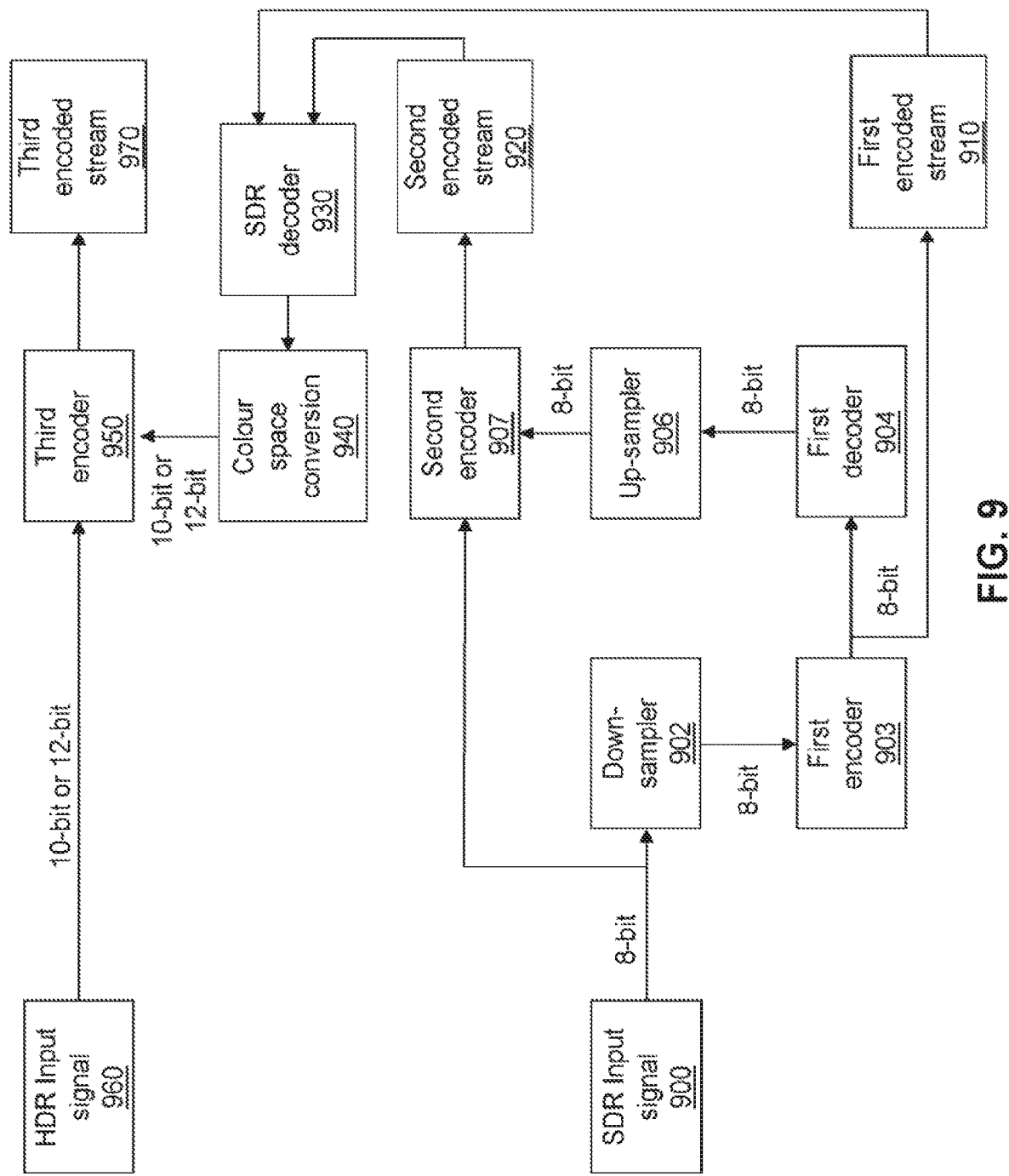
FIG. 9 shows an example of an encoding system in accordance with a third example.

FIG. 9 shows an example of an encoding system as described in this patent application. The example of FIG. 9 may be seen as a variation of the example of FIG. 7. The common features of the disclosure of FIG. 7 are not disclosed again in detail for conciseness. In particular, FIG. 9 shows an example in which there are three layers of encoding, and two separate input signals, which may be at the same resolution but may differ in colour space and/or SDR/HDR characteristics.

In this example, an SDR input signal 900, for example a low-bit-depth (e.g., 8-bit) SDR signal, is received at an encoding system. This could either be an original signal (e.g. obtained directly from a video source such as a camera or a video feed) or a HDR signal (e.g., HDR input signal 960) which has been converted from an HDR colour space (e.g. BT.2020 or BT.2100) to an SDR colour space (e.g., BT.709). The SDR signal 900 is processed by a down-sampler 902 to pass from a higher resolution to a lower resolution.

The output signal is then processed by a first encoder 903. The output of the first encoder 903 is a first encoded stream 910. The output of the first encoder 903 is further decoded by a first decoder 904, and the output decoded signal is then up-sampled by up-sampler 906 and the resulting up-sampled SDR signal is processed together with the original SDR input signal 900 by a second encoder 907 to generate a second encoded stream 920. As described with reference to FIG. 7, the second encoded stream 920 may comprise a residual signal to correct for any deficiencies in the down-sampling/up-sampling processes 902 and 906, and the encoding/decoding processes 903 and 904.

Figure 10:
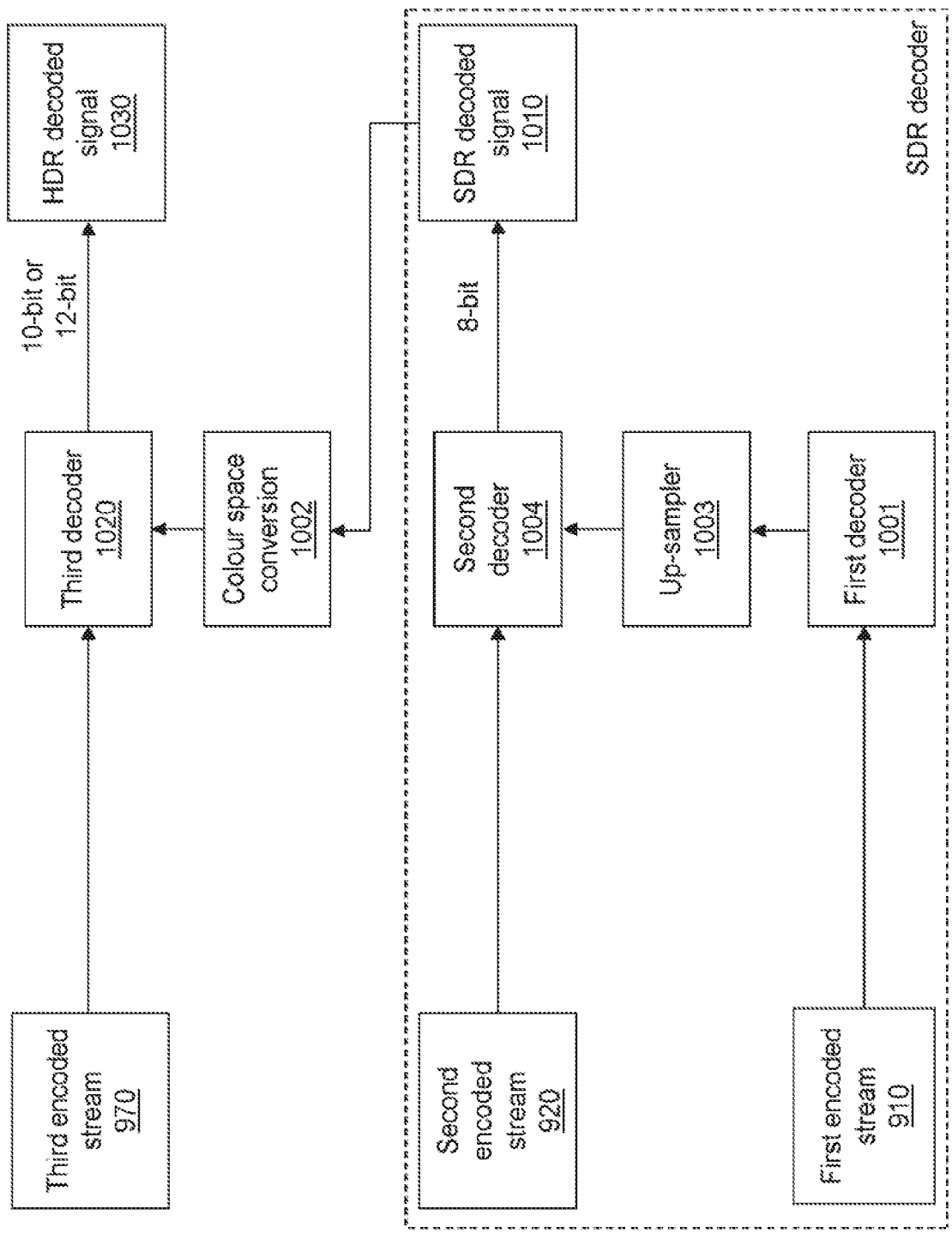
FIG. 10 shows an example of a decoding system in accordance with the third example.

The second encoded stream 920 and the first encoded stream 910 are then passed to an SDR decoder 930—the latter may be like the SDR decoder shown in the boxed area in FIG. 10. The SDR decoder 930 decodes the first encoded stream 910 and up-samples the same to create a reconstructed version of the SDR input signal 900. The second encoded stream 920 is then used, in certain cases the residual information therein, to touch-up or adjust the reconstructed version of the SDR input signal 900 into a signal which is the SDR input signal or a closer representation thereof. It should be noted that the colour space of the signal to this point is the same as that of the SDR input signal 900.

The output of SDR decoder 930 is then passed to a colour conversion module 940 to convert the decoded signal from the SDR colour space to the HDR colour space. During the conversion, the bit-depth of the signal may also be increased from the low-bit-depth (e.g. 8-bits) to the high-bit-depth (e.g. 10-bits or 12-bits) to generate an HDR signal (e.g. one having greater dynamic range for luminance and/or a wider colour gamut). The resulting HDR signal is then fed to a third encoder 950 together with the HDR input signal 960 to generate a third encoded stream 970. This third encoded stream 970 may contain the additional encoded information usable to reconstruct the HDR signal at the decoder.

The third encoded stream 970 may comprise a residual signal which primarily corrects for any deficiencies in the colour conversion process. The residual signal represents a difference between the HDR input signal 960, as a reference signal, and the resulting HDR signal. The residual signal of the third encoded stream 970 may correct for any issues resulting from the down-sampling/up-sampling processes 902 and 906, and the encoding/decoding processes 903 and 904, which are not already taken care of by the residuals of the second encoded stream 920. The residual signal may be used to adjust a corresponding colour space converted HDR signal at a decoder to reconstruct the HDR input signal 960 or a close approximation thereof. For example, a residual signal generated by the third encoder 950 may correct for a difference between the output of the SDR decoder 930, following conversion to an HDR format, and the HDR input signal 960. FIG. 10 shows an example of a decoding system. The decoding system of FIG. 10 is designed to accept the encoded streams output by the encoder of FIG. 9. A first decoder 1001 receives the first encoded stream 910 and decodes it to generate a first decoded signal. The first decoded signal is then up-sampled by up-sampler 1003 and the resulting up-sampled signal is processed by the second decoder 1004 together with the second encoded stream 920, for example by using the residual signal therein, to generate an SDR decoded signal 1010. The SDR decoded signal 1010 is then passed to a colour conversion module 1002 to convert the decoded signal from the SDR colour space to the HDR colour space. During the conversion, the bit-depth of the signal may also be increased from the low-bit-depth to the high-bit-depth to generate an HDR reconstructed signal. The HDR reconstructed signal is then passed to third decoder 1020 together with the third encoded stream 970 to generate the HDR decoded signal 1030, by using, for example, the residual signal therein. For example, the residual signal within the third encoded stream 970 may be combined (e.g. summed) with the output of the colour conversion module 1002.

The encoding and decoding system of FIGS. 9 and 10 provide a flexible and efficient technique for encoding and decoding signals, and in particular, but not exclusively, video signals which are to be available in two resolutions and two colour spaces. Two separate signals are input to the encoder, one being in a higher or more sophisticated colour space than the other. For example, one signal may be in a high dynamic range colour space (comprising for example a greater luminance range and contrast ratio and/or a wider colour gamut) and the other signal may be in a non-high dynamic range or standard dynamic range. Multiple encoded streams related to these two separate input signals are available at the decoder.

Additionally, the encoding and decoding system also provides a down-sampled version of the signal at the lower or less sophisticated colour space, for example a down-sampled version of an SDR signal at a low-bit-depth. This signal is encoded by the first encoder 903, and forms a base layer for the signal output from the encoder system. The base layer is at a lower resolution than the input signals 900, 960. Therefore, there is provided an encoding and decoding system that is more useful in ensuring backwards compatibility as more legacy decoders are able to decode the first encoded stream 910 (e.g. the base layer) at the lower resolution. For example, the first encoded stream 910 may be at a standard resolution whereas the second encoded stream 920 and the third encoded stream 970 may be at an HD or 1080p resolution. Alternatively, the first encoded stream 910 may be at an HD or 1080p resolution whereas the second encoded stream 920 and the third encoded stream 970 may be at a UHD or 4K resolution. Decoders able to handle a higher resolution will be able to take advantage of the second encoded stream 920, and in particular the residual information contained within, to up-sample and correct the up-sampled rendition at a higher resolution, for example at an UHD or 4K resolution, and to output that as the SDR decoded signal 1010. In certain cases, the SDR decoded signal 1010 may be viewable by a display device that is capable of displaying the higher resolution but that is not adapted to display video data within the first or HDR colour space. The up-sampling 1003 and correcting at the second decoder 1004 may be performed in software, and it may be possible to provide a software update to existing legacy decoders to apply this technique. Of course, this up-sampled and corrected rendition may be used as the basis for the further signal improvements provided for by the colour space conversion 1002 and the third encoded stream 970, should the decoder have such capability and a connected display have corresponding capability to display such a signal. As can be seen, the content provider can supply one or two signals of content, and the encoding and decoding system can suitably deliver the first, second and third encoded streams as necessary to reproduce the signal in three formats at various decoder/display combinations. If the second and third encoded streams 920 and 970 are based on a residual signal, this may be efficiently encoded (as it represents sparse or unstructured data as compared to the dense or structured data output by the first encoder 903). For example, a residual signal may be approximately zero-mean and may comprise many zero values (in areas where the two signals being compared do not differ). This form of signal may be efficiently compressed.

Figure 11:
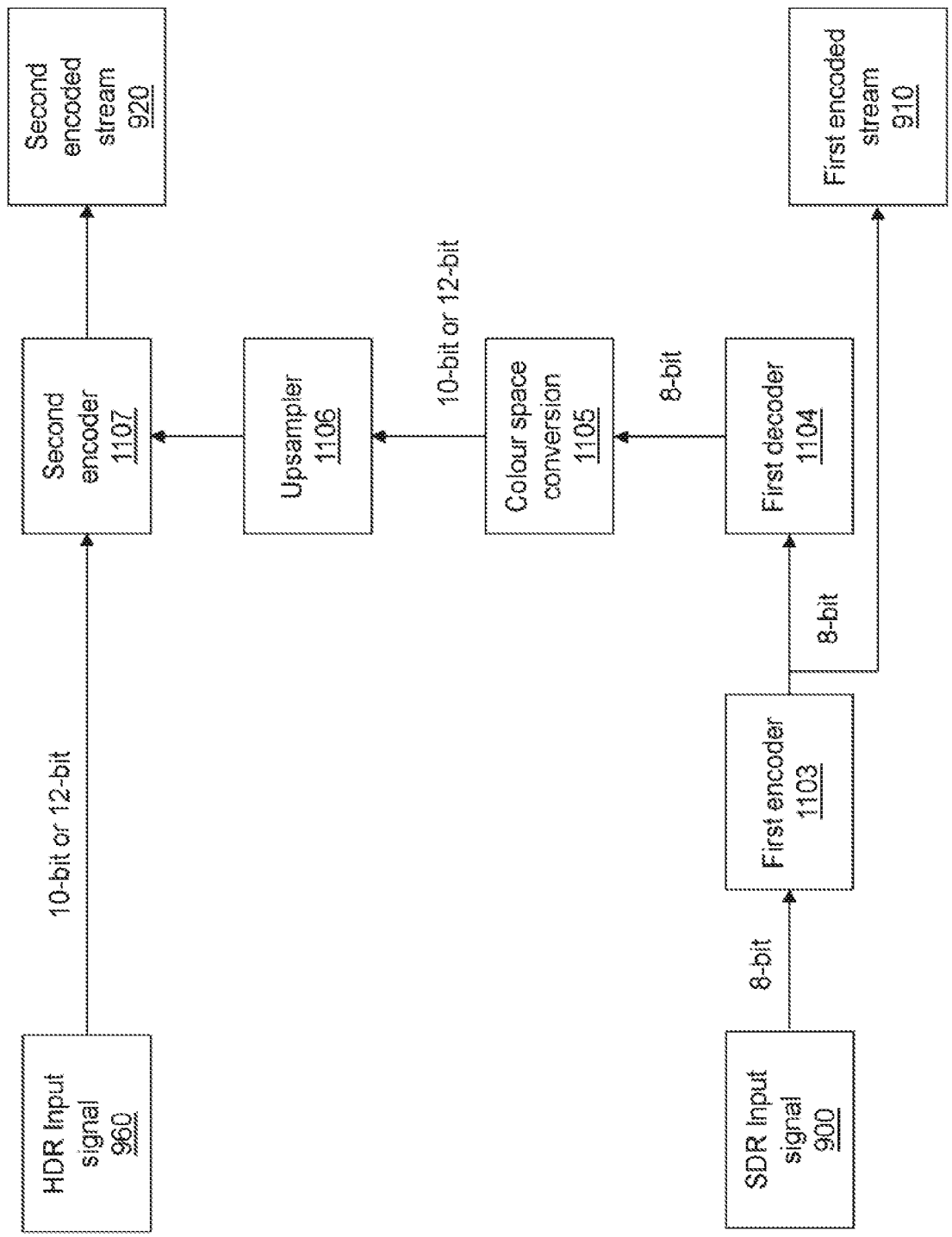
FIG. 11 shows an example of an encoding system in accordance with the first example.

FIG. 11 shows an example of an encoding system as described in this patent application. An SDR input signal 900, for example a low-bit-depth (e.g., 8-bit) SDR signal, is received at an encoding system. This could either be an original signal (e.g. obtained directly from a video source such as a camera or a video feed) or an HDR input signal (e.g., HDR input signal 960) which has been converted from an HDR colour space (e.g. BT.2020 or BT.2100) to an SDR colour space (e.g., BT.709). The SDR input signal 900 is then processed by the first encoder 1103. The output of the first encoder 1103 is a first encoded stream 910. The output of the first encoder 1103 is further decoded by first decoder 1104, and the output decoded signal is then passed to a colour conversion module 1105 to convert the decoded signal back from the SDR colour space to the HDR colour space. During the conversion, the bit-depth of the signal may be increased from the low-bit-depth to the high-bit-depth to generate an HDR signal. The HDR signal is then up-sampled by up-sampler 1106 and the resulting up-sampled HDR signal is processed together with an HDR original input signal 960 by the second encoder 1107 to generate a second encoded stream 920.

In one example, the conversion and up-sampling can be done in reverse order, i.e. first the up-sampling and then the conversion. In another example, the up-sampling operation is not done and therefore the converted signal is passed straight to the second encoder 1107. In one case, performing colour conversion prior to upsampling may be beneficial, as the colour conversion may be performed more rapidly at a lower resolution. If a residual signal is generated by the second encoder 1107 this will correct for any difference between the HDR input signal 960 and the output of the upsampler 1106.

The first encoded stream 910 and the second encoded stream 920 can be then sent to a decoder such as that described in FIG. 8 (e.g., in place of corresponding first encoded stream 710 and second encoded stream 720 as shown in FIG. 11) and decoded accordingly to produce decoded SDR signal 820 and decoded HDR signal 810.

Figure 12:
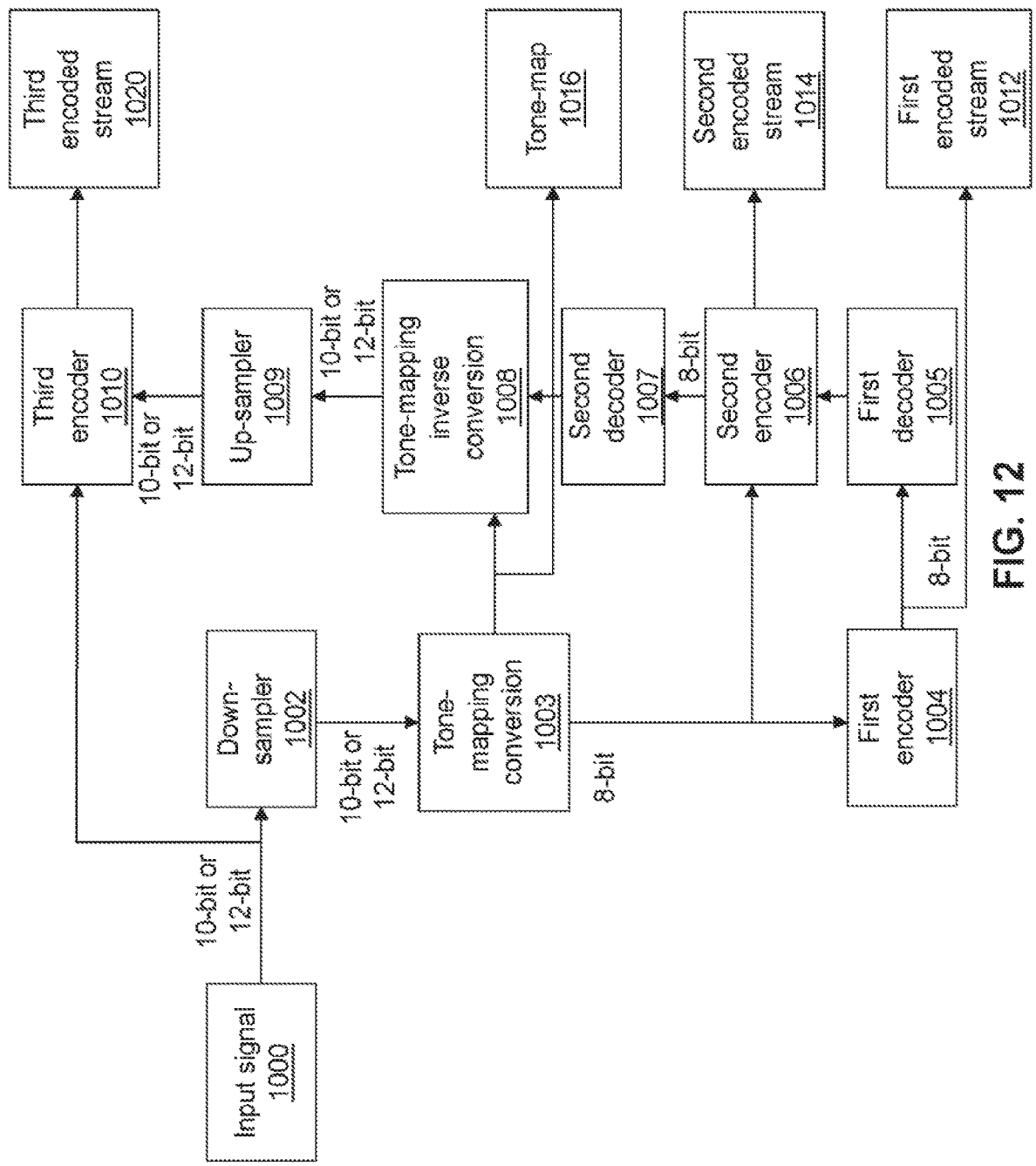
FIG. 12 shows an example of an encoding system in accordance with a fourth example.

FIG. 12 shows an example of an encoding system as described in this patent application. An input signal 1000, for example a high-bit-depth (e.g., 10-bit or 12-bit) HDR signal, is received at an encoding system. The input signal is then processed by a down-sampler 1002 to pass from a higher resolution to a lower resolution. The down-sampled signal may then be converted by using a tone-mapping converter 1003 into a tone-mapped converted down-sampled signal. The tone-mapping converter 1003 derives a tone-map 1016 for the input signal using conventional and/or known tone-mapping operators and algorithms (by way of background only the reader can refer to patent publications US20150078661, US20170070719 or U.S. Pat. No. 9,437,171, which are incorporated herein by reference). The conversion may include adjusting various parameters associated with the down-sampled signal, for example by way of non-limiting example luma and chroma values; brightness, contrast, and colour; gamma logic; chroma decimation, scaling, chroma noise reduction, etc. In the process of conversion, the tone-map converter 1003 may further convert the down-sampled signal from a high-bit-depth (e.g., 10-bit or 12-bit) HDR signal into a low-bit-depth (e.g., 8-bit) SDR signal. For example, this may be most beneficial when the first encoder 1004 is capable of processing only 8-bit signals rather than 10-bit or higher bit-depth signals. The tone-map 1016 may be transmitted (e.g., by way of metadata) to a decoding system, e.g. either compressed or uncompressed. The tone-mapped downsampled signal is then processed by the first encoder 1004. In one example, the conversion and down-sampling can be done in reverse order, i.e. first the down-sampling and then the conversion. In another example, the down-sampling operation is not done and therefore the converted signal is passed straight to the first encoder 1004.

The output of the first encoder 1004, namely the first encoded stream 1012, is further decoded by first decoder 1005 to generate a first decoded signal. Optionally, the first decoded signal is processed by a second encoder 1006 together with the tone-mapped downsampled signal to generate a second encoded stream 1014. Optionally, the second encoded stream is decoded by second decoder 1007 and is added (not shown) to the first decoded signal in order to generate a second decoded signal. The second decoded signal (or, in the case the second encoder and the second decoder are not used, the first decoded signal) is then processed by tone-mapping inverse converter 1008 which, using the tone map 1016 generated by tone-mapping converter 1003, generates a tone-map adjusted signal. The tone-mapping inverse converter 1008 may be operating in an inverse manner to the tone-mapping converter by re-adjusting the signal as indicated by the tone-map, using conventional and/or known inverse tone-mapping operators and algorithms (by way of background only the reader can refer to the aforementioned patent publications). If the second decoded signal was a low-bit-depth one (e.g., 8-bit) SDR signal, then the tone-mapping inverse converter may further convert the second decoded signal from a low-bit-depth (e.g., 8-bit) SDR signal to a high-bit-depth (e.g., 10-bit or 12-bit) HDR signal. The signal is then up-sampled by up-sampler 1009 and the resulting up-sampled signal is processed together with the original input signal by the third encoder 1010 to generate a third encoded stream 1020. In one example, the conversion and up-sampling can be done in reverse order, i.e. first the up-sampling and then the conversion. In another example, the up-sampling operation is not done and therefore the converted signal is passed straight to the third encoder 1010.

The optional second encoder 1006 may operate to correct the differences between the output of the first decoder and the tone-mapped down-sampled signal. This can be done, for example, by way of deriving the differences (e.g., residuals) between the output of the first decoder and the tone-mapped down-sampled signal and encoding said residuals in an efficient way. The encoded residuals can then be processed back by the optional second decoder 1007 to decode them, and add them to the first decoded signal, thus generating a second decoded signal which is effectively a corrected version of the first decoded signal.

Likewise, the third encoder 1010 may operate to correct the differences between the original input signal 1000 and the up-sampled HDR signal, e.g. the output of the up-sampler 1009. This can be done, for example, by way of deriving the differences (e.g., residuals) between the original input signal and the up-sampled HDR signal and encoding said residuals in an efficient way. The encoded residuals can then be processed back by a decoding system and added to the up-sampled HDR signal.

The optional second encoder/decoder and third encoder/decoder may operate, for example, in manners like those described in patent publications WO2014/170819, WO2013/011466, WO2013/011492 or WO2017/089839, all of which are incorporated herein by reference.

By deriving the tone-map over a lower resolution signal (e.g. after down-sampling) the processing of the tone-map is greatly reduced as it is done over a smaller number of pixels and therefore it can be done more quickly. Moreover, the size of the tone-map would be reduced compared to a tone-map at full-resolution, and if then compressed it can yield even greater efficiency. In addition, if the optional second encoder/decoder are used in the processing, any artefacts (e.g., colour banding, blocks, etc.) introduced by the first encoder/decoder can be corrected at a lower resolution, thus allowing an efficient correction of such artefacts when compared to those artefacts being corrected at a higher resolution. In addition, the third encoder will further enhance the signal by adding further residuals in order to bring the encoded signal as close as possible to the HDR input signal.

Figure 13:
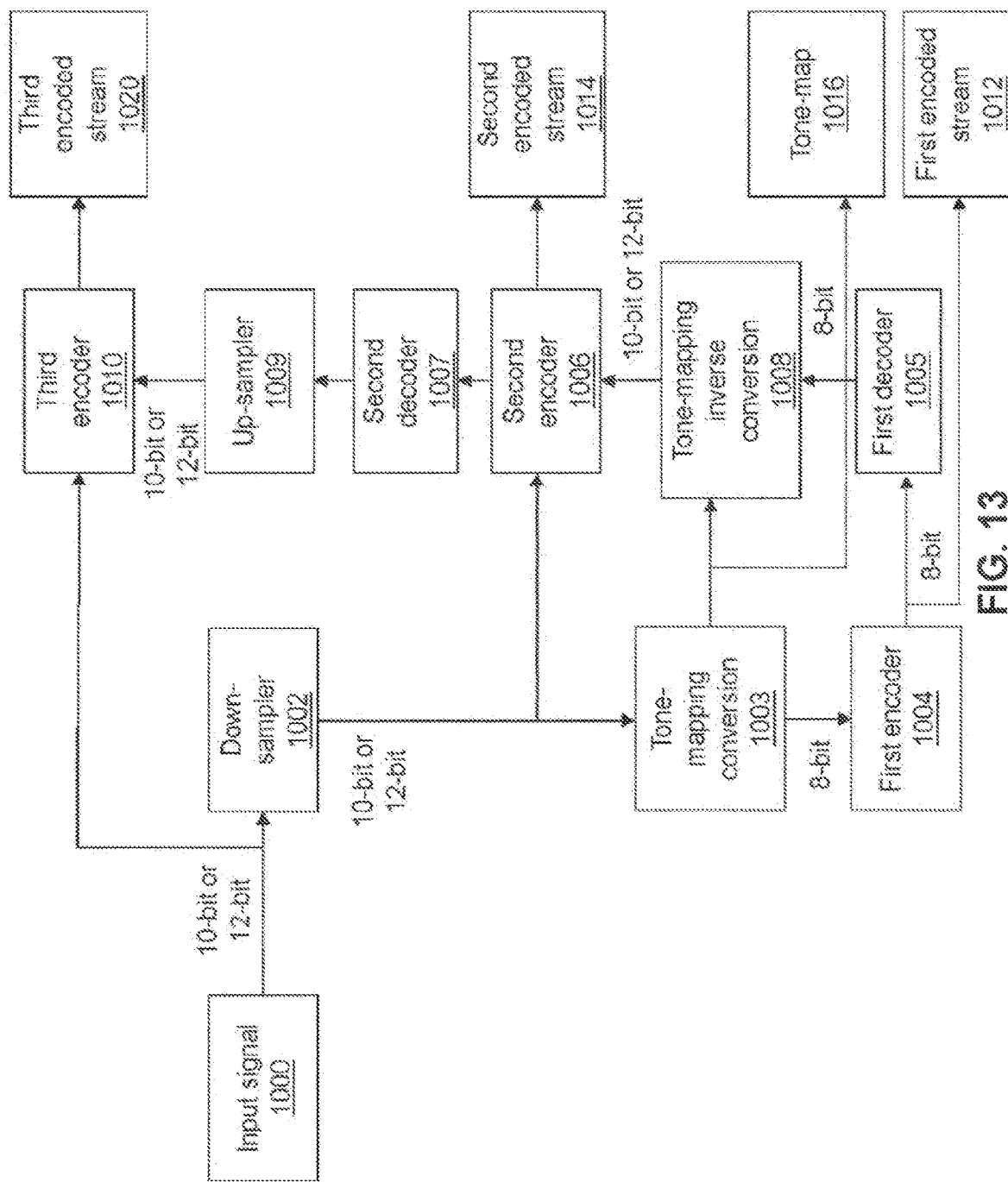
FIG. 13 shows an example of an encoding system in a first variation of the fourth example.

FIG. 13 shows an example of an encoding system as described in this patent application. An input signal 1000, for example a high-bit-depth (e.g., 10-bit or 12-bit) HDR signal, is received at an encoding system. The input signal is then processed by a down-sampler 1002 to pass from a higher resolution to a lower resolution. The down-sampled signal may then be converted by using a tone-mapping converter 1003 into a tone-mapped converted down-sampled signal. The tone-mapping converter 1003 derives a tone-map 1016 of the input signal using conventional and/or known tone-mapping operators and algorithms (e.g. as discussed above). The conversion may include adjusting various parameters associated with the down-sampled signal, for example by way of non-limiting example luma and chroma values; brightness, contrast, and colour; gamma logic; chroma decimation, scaling, chroma noise reduction, etc. In the process of conversion, the tone-map converter 1003 may further convert the down-sampled signal from a high-bit-depth (e.g., 10-bit or 12-bit) HDR signal into a low-bit-depth (e.g., 8-bit) SDR signal. For example, this may be most beneficial when the first encoder 1004 is capable of processing only 8-bit signals rather than 10-bit or higher bit-depth signals. The tone-map 1016 may be transmitted (e.g., by way of metadata) to a decoding system either by compressed or uncompressed. The tone-mapped down-sampled signal is then processed by the first encoder 1004. In one example, the conversion and down-sampling can be done in reverse order, i.e. first the down-sampling and then the conversion. In another example, the down-sampling operation is not done and therefore the converted signal is passed straight to the first encoder 1004. The output of the first encoder 1004, namely the first encoded stream 1012, is further decoded by first decoder 1005 to generate a first decoded signal. The first decoded signal is then processed by tone-mapping inverse converter 1008 which, using the tone map 1016 generated by tone-mapping converter 1003, to generate a tone-map adjusted signal. The tone-mapping inverse converter 1008 may be operating in an inverse manner than the tone-mapping converter by re-adjusting the signal as indicated by the tone-map, using conventional and/or known inverse tone-mapping operators and algorithms (e.g. as discussed above). If the second decoded signal was a low-bit-depth one (e.g., 8-bit) SDR signal, then the tone-mapping inverse converter may further convert the second decoded signal from a low-bit-depth (e.g., 8-bit) SDR signal to a high-bit-depth (e.g., 10-bit or 12-bit) HDR signal. Optionally, the tone-mapped corrected signal is processed by a second encoder 1006 together with the down-sampled signal to generate a second encoded stream 1014. Optionally, the second encoded stream is decoded by second decoder 1007 and is added (not shown) to the first decoded signal in order to generate a second decoded signal. The second decoded signal (or, in the case the second encoder and the second decoder are not used, the first decoded signal) is then up-sampled by up-sampler 1009 and the resulting up-sampled signal is processed together with the original input signal by the third encoder 1010 to generate a third encoded stream 1020. In one example, the conversion and up-sampling can be done in reverse order, i.e. first the up-sampling and then the conversion. In another example, the up-sampling operation is not done and therefore the converted signal is passed straight to the third encoder 1010.

The optional second encoder 1006 may operate to correct the differences between the output of the first decoder and the down-sampled signal. This can be done, for example, by way of deriving the differences (e.g., residuals) between the output of the first decoder and the down-sampled signal and encoding said residuals in an efficient way. The encoded residuals can then be processed back by the optional second decoder 1007 to decode them, and add them to the first decoded signal, thus generating a second decode signal which is effectively a corrected version of the first decoded signal.

Likewise, the third encoder 1010 may operate to correct the differences between the original input signal and the up-sampled HDR signal. This can be done, for example, by way of deriving the differences (e.g., residuals) between the original input signal and the up-sampled HDR signal and encoding said residuals in an efficient way. The encoded residuals can then be processed back by a decoding system and added to the up-sampled HDR signal.

The optional second encoder/decoder and third encoder/decoder may operate, for example, in manners similar to those described in the patent publications discussed above.

By deriving the tone-map over a lower resolution signal (e.g. after down-sampling) the processing of the tone-map is greatly reduced as it is done over a smaller number of pixels and therefore it can be done more quickly. Moreover, the size of the tone-map would be reduced compared to a tone-map at full-resolution, and if then compressed it can yield even greater efficiency. In addition, if the optional second encoder/decoder are used in the processing, any artefacts (e.g., colour banding, blocks, etc.) introduced by the first encoder/decoder and/or by the tone-mapping processing can be corrected at a lower resolution, thus allowing an efficient correction of such artefacts when compared to those artefacts being corrected at a higher resolution. In addition, the third encoder will further enhance the signal by adding further residuals in order to bring the encoded signal as close as possible to the HDR input signal.

Figure 14:
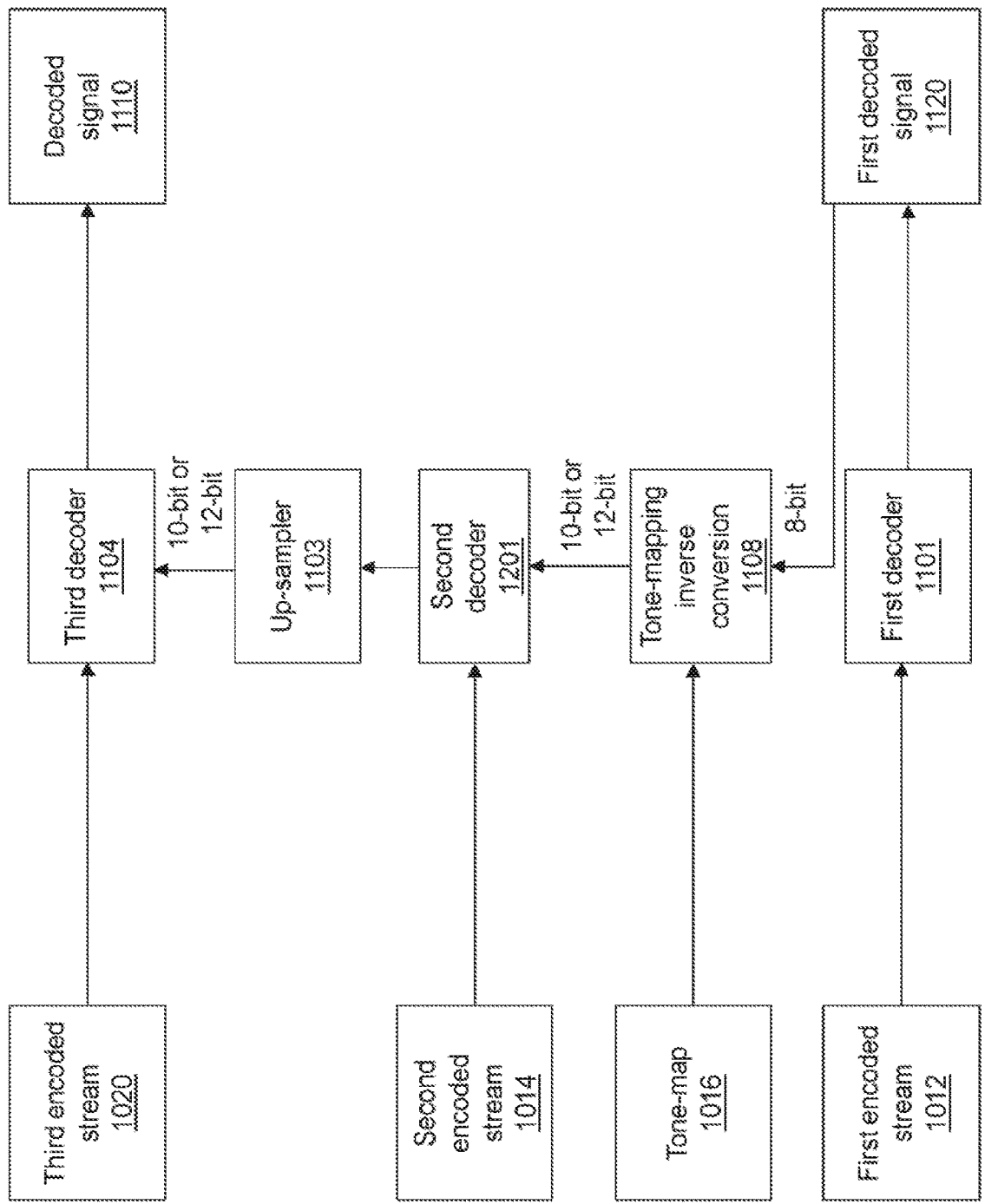
FIG. 14 shows an example of a decoding system corresponding to the first variation.

FIG. 14 shows an example of a decoding system as described in this patent application. A first decoder 1101 receives the first encoded stream 1010 and decodes it to generate a first decoded signal 1120. The first decoded signal 1120 is then processed by tone-mapping inverse converter 1108 which, using the received tone map metadata 1016, generates a tone-map adjusted signal. The tone-mapping inverse converter 1108 may be operating in an inverse manner than a tone-mapping converter by re-adjusting the signal as indicated by the tone-map, using conventional and/or known inverse tone-mapping operators and algorithms (e.g. as described above). If the first decoded signal was a low-bit-depth one (e.g., 8-bit) SDR signal, then the tone-mapping inverse converter may further convert the first decoded signal from a low-bit-depth (e.g., 8-bit) SDR signal to a high-bit-depth (e.g., 10-bit or 12-bit) HDR signal. Optionally, a second decoder 1201 decodes the second encoded stream 101 to generate a decoded first residual stream. Further, the tone-map adjusted signal is optionally processed by the second decoder 1201 together with the decoded first residual stream to generate a second decoded signal. The second decoded signal (or, in the event that no second encoded stream 1014 is received and therefore no second decoder 1201 is used, the tone mapped adjusted signal) is then up-sampled by up-sampler 1103 to generate a tone-mapped corrected up-sampled signal.

In one example, the tone-mapped conversion and up-sampling can be done in reverse order, i.e. first the up-sampling and then the conversion. In another example, the up-sampling operation is not done and therefore the tone-mapped signal is passed straight to the up-sampler 1103. A third decoder 1104 decodes the third encoded stream 1020 to generate a decoded second residual stream. The tone-mapped corrected up-sampled signal is further processed by a third decoder 1104 together with the decoded second residual stream to generate a third decoded signal. The third decode signal may be an HDR signal.

By processing the tone-map over a lower resolution signal (e.g. before up-sampling) the processing of the tone-map is greatly reduced as it is done over a smaller number of pixels and therefore it can be done more quickly. Moreover, the size of the tone-map would be reduced compared to a tone-map at full-resolution, and the de-compression can be much more efficient. In addition, if the optional second decoder are used in the processing, any artefacts (e.g., colour banding, blocks, etc.) introduced by the first decoder and/or by the tone-mapping processing can be corrected at a lower resolution, thus allowing an efficient correction of such artefacts when compared to those artefacts being corrected at a higher resolution. In addition, the third encoded stream will further enhance the signal by adding further residuals in order to bring the encoded signal as close as possible to the HDR input signal.

The examples of FIGS. 12 to 14 may be applied when dynamic tone mapping is implemented, e.g. where the tone mapping parameters vary based on the frame being processed. As the present examples may be easily applied to consecutive frames, e.g. each frame is processed in an independent manner, they may be efficiently and easily implemented in encoder and decoder systems.

Examples described herein allow efficient conversion of a 10-bit or 12-bit HDR video into a data set comprising an 8-bit lower resolution video, a tone-map for local reconstruction of the 10-bit or 12-bit HDR information and correction metadata to reconstruct the full-resolution full-quality picture. Performing the tone-map conversions at lower resolution within a tier-based encoding method provides a set of unique benefits, such as allowing to minimize the processing power needed for such operations (at both encoding and decoding, which is particularly important for live video as well as low power decoder devices). For example, the availability of correction metadata allows to correct any banding that may be introduced in the "10-bit to 8-bit to 10-bit" conversion process. Finally, the 10-bit or 12-bit to 8-bit conversion can be calibrated either to provide a viewable backward-compatible 8-bit Standard Dynamic Range (SDR) lower resolution video or to maximize compression efficiency, by intelligently distributing the local image histogram for maximum compression.

In the conversions discussed in the above examples, there may be used so-called "blind" conversions in the decoder, or where the encoder is simulating actions of the decoder. This means that conversions may be performed in a stand-alone manner that facilitates modular replacement of conversion functions. This applies to up-sampling, down-sampling, colour space conversion, HDR to SDR conversion and vice versa, signal element coding format changes, etc. For example, different conversion methods may be applied for different frames or different video stream. This may be signalled between the encoder and decoder to co-ordinate encoding and decoding. However, no change is needed in the system architecture or processing flows to accommodate these changes. This may be enabled by the use of residual signals that are processing agnostic, e.g. they correct for differences between two compared signals—a reference signal and a reconstructed signal—but the reconstructed signal may be generated in a variety of ways. The present examples are also able to operate on small portions of video data in parallel, e.g. coding units or blocks of 2×2 or 4×4 pixels. This is because certain implementations of the processing flows do not introduce spatial dependencies within portions of a frame of video data. This enables efficient parallel processing of different frame portions, e.g. the examples may be applied in parallel on different frame portions and then a final output composed to generate an output signal at one or more levels of quality.

Certain examples described herein present an easily implementable low-complexity scheme that can process different colour representations, where these colour representations may represent different levels of colour quality. In certain examples, individual conversion components or modules are not trying to predict signals and so operate in a stand-alone fashion; enhancement signals using residuals can then provide appropriate adjustment. This approach also makes it possible to take a more modular approach to these conversion components or modules, changing them where necessary without needing to consider transmission stream changes for metadata.

Several types of colour space conversion can be performed. In particular, non-linear colour space conversions can be used.

Additional efficiency may be achieved by using residual information (i.e. only changes to a signal) to encode the colour space, HDR, or signal element coding format information when changing from a relatively low sophistication signal to a relatively high sophistication signal.

In all of the above examples, the first encoding module/encoder (and correspondingly the first decoding module/decoder) may correspond to any type of coding schemes such as standard MPEG codecs (e.g., AVC, HEVC, etc.), non-standard codecs (e.g., VP9, AV1, etc.) or hierarchical codecs such as PERSEUS®.

The above descriptions are provided by way of non-limiting examples, and any variation or combination of the above is included in the present description.

What is claimed is:

1. A method of encoding a signal, the method comprising:
    processing an input signal at least by converting the input signal from a first color space to a second color space, to produce a first processed signal;
    encoding, by a first encoding module, the first processed signal to generate a first encoded signal;
    decoding the first encoded signal to generate a decoded signal;
    processing the decoded signal at least by converting the decoded signal from the second color space to the first color space, to produce a second processed signal; and
    processing, by a second encoding module, the second processed signal and the input signal to generate a second encoded signal,
    wherein the second encoded signal contains additional ancillary data for reconstruction of the input signal using the first encoded signal and the additional ancillary data contains metadata for reconstructing a wide color gamut signal.

2. The method of claim 1, wherein the second encoded signal comprises a residual signal or an adjustment signal for reconstruction of the input signal using the first encoded signal.

3. The method of claim 2, wherein generating the residual signal or the adjustment signal comprises taking a difference between the input signal and the second processed signal.

4. The method of claim 1, wherein the method comprises down-sampling the input signal.

5. The method of claim 4, wherein the down-sampling reduces a resolution of the input signal.

6. The method of claim 4, wherein the method comprises down-sampling the input signal before converting the input signal from a first color space to a second color space and up-sampling the decoded signal before converting the decoded signal from the second color space to the first color space.

7. The method of claim 4, wherein the method comprises down-sampling the input signal after converting the input signal from a first color space to a second color space and up-sampling the decoded signal after converting the decoded signal from the second color space to the first color space.

8. The method of claim 1, wherein the converting from a first color space to a second color space comprises one or more of the following operations:
mapping a color space;
changing a sampling pattern;
converting from a first bit depth to a second bit depth, wherein the first bit depth is greater than the second bit depth;
changing a dynamic range of the luminance component;
changing the color gamut;
changing the electro-optic transfer function model;
changing the lowest luminance level;
changing the highest luminance level; and
tone mapping.

9. The method of claim 1, wherein the input signal comprises a plurality of frames in succession, and wherein each successive frame is encoded by the first encoding module.

10. The method of claim 1, wherein the step of converting the input signal from a first color space to a second color space is non-linear.

11. The method of claim 1, wherein the step of converting the input signal from a first color space to a second color space, to produce a first processed signal, is non-predictive.

12. A method of decoding a signal, the method comprising:
decoding, by a first decoding module, a first encoded signal to generate a first decoded signal;
decoding, by a second decoding module, a second encoded signal to generate a second decoded signal;
processing the first decoded signal at least by converting said first decoded signal from a first color space to a second color space, to produce a processed decoded signal;
processing the second decoded signal and the processed decoded signal by the second decoding module to generate a combined decoded signal,
wherein the second encoded signal contains additional ancillary data for reconstruction of the input signal using the first encoded signal and the additional ancillary data contains metadata for reconstructing a wide color gamut signal.

13. The method of claim 12, comprising selecting to convert the combined decoded signal back to the first color space when a display is capable of displaying a signal only in the first color space.

14. The method of claim 12, wherein the second encoded signal comprises a residual signal or an adjustment signal for reconstruction of an original input signal using the first encoded signal, wherein the residual signal or the adjustment signal is added to the processed decoded signal to generate the combined decoded signal.

15. The method of claim 12, wherein the converting from a first color space to a second color space comprises converting from a non-high dynamic range signal to a dynamic range signal.

16. The method of claim 15, comprising sensing if a connected display is unable to display the high dynamic range signal, and if so, outputting the first decoded signal.

17. The method of claim 12, wherein the first encoded signal comprises all frames of the combined decoded signal, wherein each frame in the first encoded signal is decoded by the first decoding module and provides a base version of the combined decoded signal, and wherein the second encoded signal comprises enhancement information for each frame of the base version.

18. A non-transitory computer-readable storage medium comprising instructions which when executed by a processor cause the processor to:
process an input signal at least by converting the input signal from a first color space to a second color space, to produce a first processed signal;
encode, by a first encoding module, the first processed signal to generate a first encoded signal;
decode the first encoded signal to generate a decoded signal;
process the decoded signal at least by converting the decoded signal from the second color space to the first color space, to produce a second processed signal; and
process, by a second encoding module, the second processed signal and the input signal to generate a second encoded signal,
wherein the second encoded signal contains additional ancillary data for reconstruction of the input signal using the first encoded signal and the additional ancillary data contains metadata for reconstructing a wide color gamut signal.

* * * * *